US 10,703,014 B2

(12) United States Patent
Leesman et al.

(10) Patent No.: US 10,703,014 B2
(45) Date of Patent: Jul. 7, 2020

(54) SYSTEM AND METHOD FOR EMBEDDING SUBSTRATE IN CONCRETE STRUCTURE

(71) Applicant: Morton Buildings, Inc., Morton, IL (US)

(72) Inventors: John H. Leesman, Gilbert, IL (US); Graham C. G. Morris, Eureka, IL (US)

(73) Assignee: Morton Buildings, Inc., Morton, IL (US)

( * ) Notice: Subject to any disclaimer, the term of this patent is extended or adjusted under 35 U.S.C. 154(b) by 0 days.

(21) Appl. No.: 15/979,288

(22) Filed: May 14, 2018

(65) Prior Publication Data

US 2018/0328024 A1    Nov. 15, 2018

Related U.S. Application Data

(60) Provisional application No. 62/506,432, filed on May 15, 2017, provisional application No. 62/571,920, filed on Oct. 13, 2017.

(51) Int. Cl.
*B28B 23/04* (2006.01)
*E04C 5/08* (2006.01)
(Continued)

(52) U.S. Cl.
CPC ............ *B28B 23/043* (2013.01); *B29C 70/16* (2013.01); *B29C 70/56* (2013.01); *E04B 1/41* (2013.01);
(Continued)

(58) Field of Classification Search
CPC ........ E04B 1/41; E04B 1/4171; E04B 1/4107; E04C 5/07; E04C 5/085; B28B 23/043
See application file for complete search history.

(56) References Cited

U.S. PATENT DOCUMENTS 1,018,538 A  *  2/1912  Wilde .................... E01B 9/28
238/265
2,210,444 A  *  8/1940  Case ...................... B28B 1/525
52/515

(Continued)

FOREIGN PATENT DOCUMENTS

CA    2191241 A1    12/1995
CA    2298281 A1    8/2001

OTHER PUBLICATIONS

Office Action (CA Application No. 3,004,964); dated Apr. 25, 2019; 6 pages.

*Primary Examiner* — Brian D Mattei
(74) *Attorney, Agent, or Firm* — Howard & Howard Attorneys PLLC

(57) ABSTRACT

A system and method for allowing components to attach to a pre-cast pre-stressed concrete structure is provided. The system includes a first attachment part and a second attachment part. The first attachment part has a first body. The first body has a first concrete structure facing side and a first plurality of attachment members extending from the concrete structure facing side. The second attachment part has a second body. The second body has a second concrete structure facing side and a second plurality of attachment members extending from the concrete structure facing side. The first and second attachment parts are spaced apart forming a compressible junction therebetween. The pre-cast, pre-stressed concrete structure is formed from uncured cement, at least of a portion of the first and second attachment members being embedded in the pre-cast, pre-stressed concrete structure.

13 Claims, 32 Drawing Sheets

(51) Int. Cl.
*E04B 1/41* (2006.01)
*E04C 5/12* (2006.01)
*B29C 70/16* (2006.01)
*B29C 70/56* (2006.01)
*E04C 5/07* (2006.01)
*E04C 3/26* (2006.01)
*B29C 70/50* (2006.01)
*D06M 101/40* (2006.01)

(52) U.S. Cl.
CPC .............. *E04B 1/4171* (2013.01); *E04C 5/07* (2013.01); *E04C 5/085* (2013.01); *E04C 5/127* (2013.01); *B29C 70/50* (2013.01); *B29C 2791/003* (2013.01); *D06M 2101/40* (2013.01); *E04C 3/26* (2013.01)

(56) References Cited

U.S. PATENT DOCUMENTS

| | | | |
|---|---|---|---|
| 2,355,771 A * | 8/1944 | Yeoman | E01C 11/14 404/53 |
| 4,052,833 A * | 10/1977 | Beine | E04B 1/4107 52/710 |
| 4,946,099 A * | 8/1990 | Bratchell | E01B 9/28 238/264 |
| 5,060,466 A | 10/1991 | Matsuda et al. | |
| 5,729,939 A * | 3/1998 | Di Benedetto | E04B 1/41 52/293.3 |
| 5,729,951 A * | 3/1998 | Frohlich | B21K 25/00 52/698 |
| 5,826,398 A * | 10/1998 | Carnicle | E04C 5/161 52/698 |
| 10,167,626 B1 * | 1/2019 | Marwood | E04B 1/7616 |
| 2002/0104285 A1 * | 8/2002 | Schulze | E04B 1/355 52/742.1 |
| 2007/0125017 A1 * | 6/2007 | Blount | B28B 23/043 52/223.1 |
| 2011/0000150 A1 * | 1/2011 | Wurth | B66B 11/0005 52/173.1 |
| 2012/0177435 A1 * | 7/2012 | Curtis | E04F 15/142 403/28 |
| 2013/0036679 A1 * | 2/2013 | Nyce | E04H 12/2261 52/105 |
| 2013/0248671 A1 * | 9/2013 | Schleiermacher | E04B 1/41 248/309.1 |
| 2014/0250825 A1 * | 9/2014 | Richardson | E04B 1/4107 52/710 |
| 2017/0362817 A1 * | 12/2017 | Albartus | E04B 1/41 |
| 2018/0171621 A1 * | 6/2018 | Kuelker | E04F 13/0851 |
| 2018/0223532 A1 * | 8/2018 | Bennett | E04C 5/08 |
| 2019/0153728 A1 * | 5/2019 | Kim | E04C 2/06 |

* cited by examiner

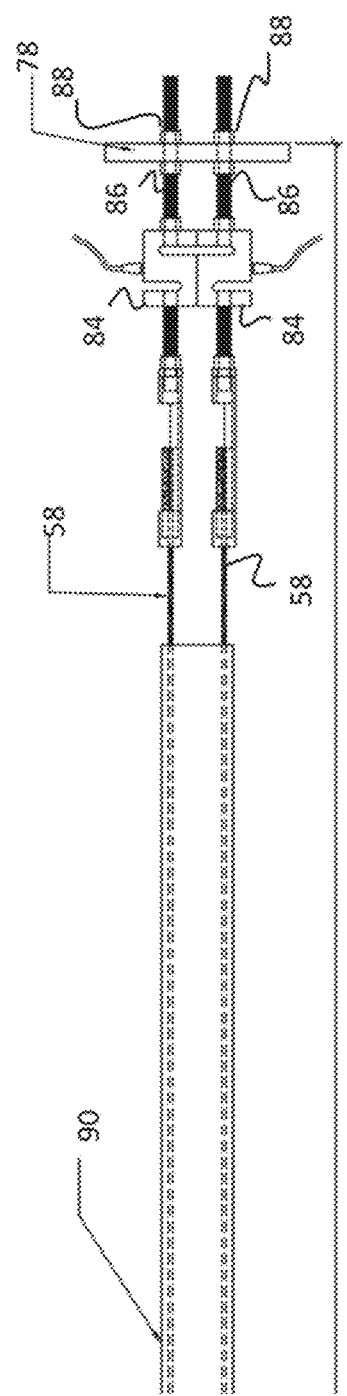

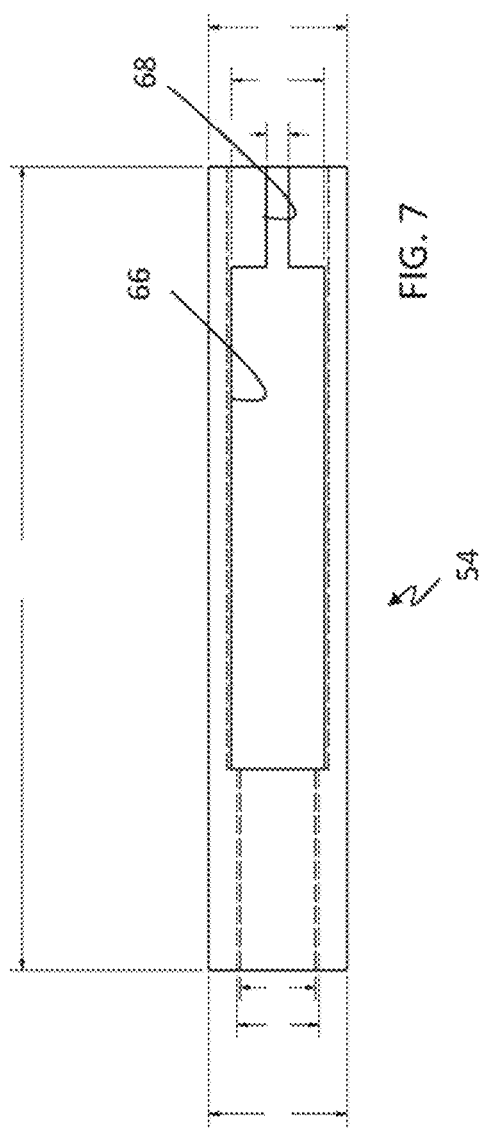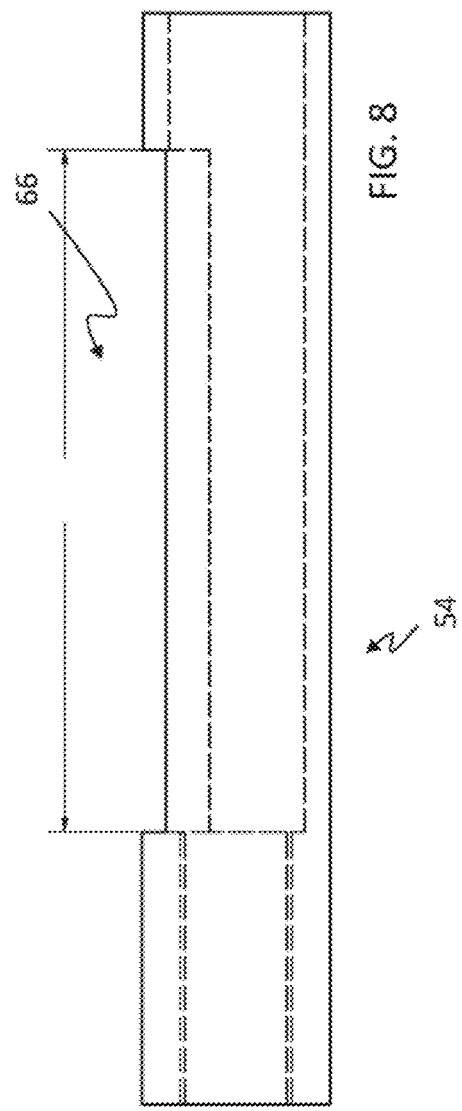

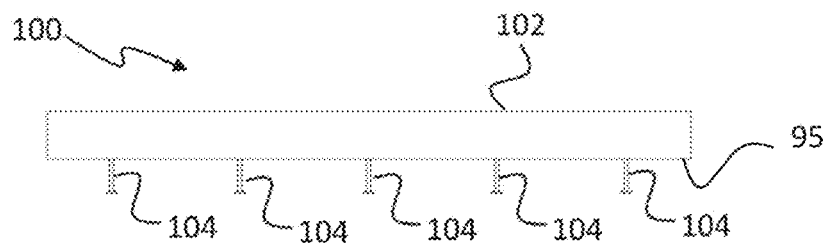
FIG. 26A
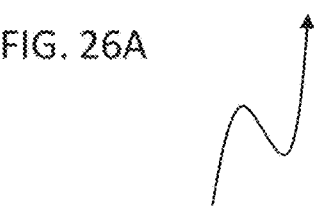
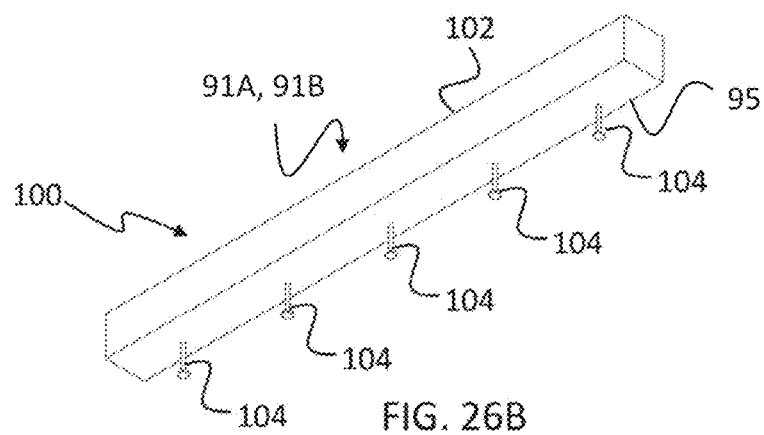
FIG. 26B
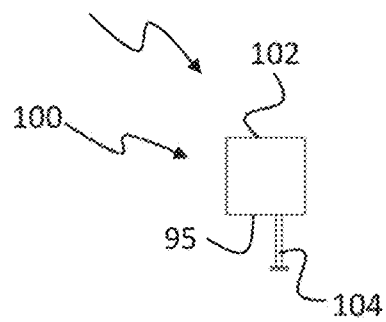
FIG. 26C

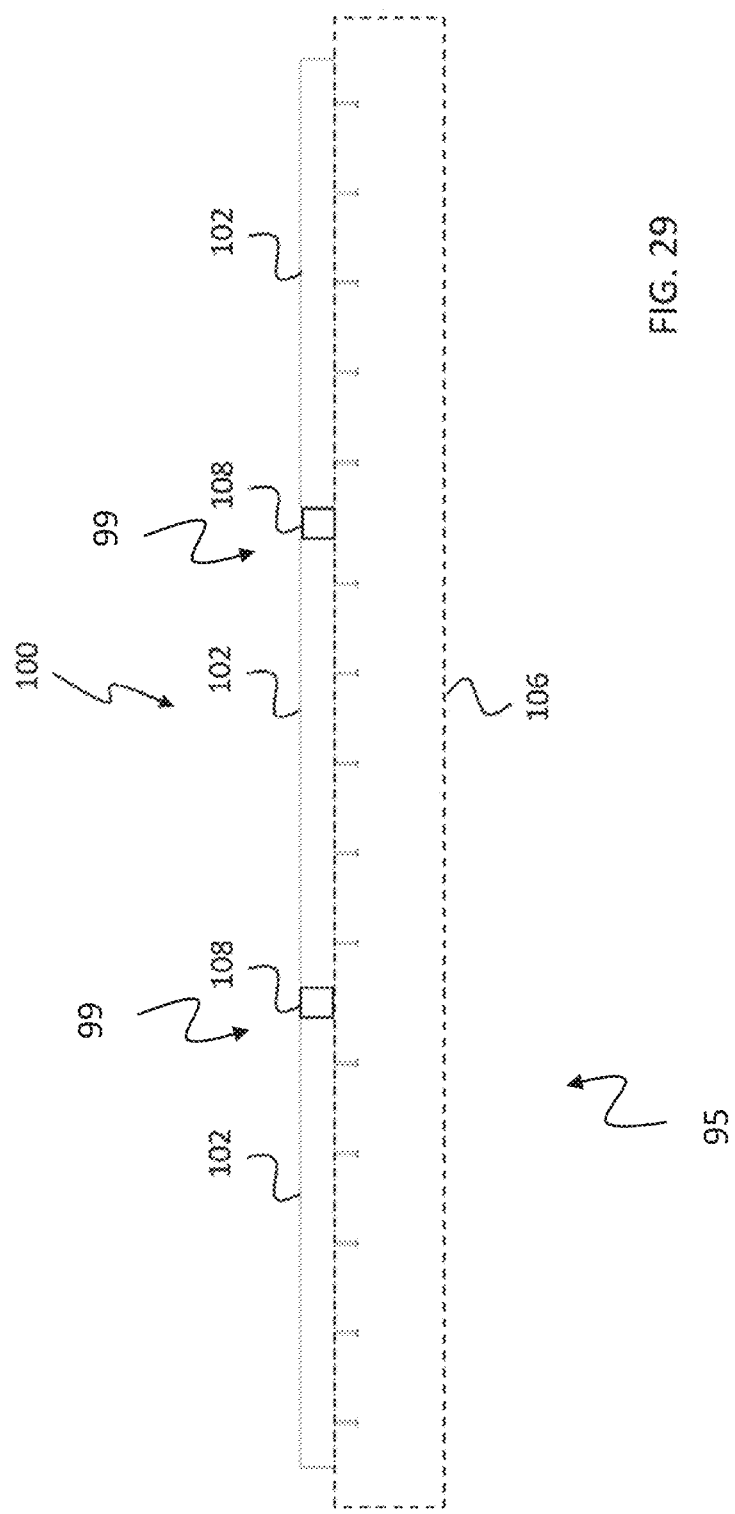

SYSTEM AND METHOD FOR EMBEDDING SUBSTRATE IN CONCRETE STRUCTURE

CROSS-REFERENCE TO RELATED APPLICATION

This application claims priority to U.S. Provisional Patent Application Ser. No. 62/506,432, filed on May 15, 2017 and U.S. Provisional Patent Application Ser. No. 62/571,920, filed on Oct. 13, 2017, the disclosures of which are hereby incorporated by reference in their entirety and for all purposes.

TECHNICAL FIELD

The present invention is related to concrete structures, and more particularly, to a system and method for embedding a substrate in a pre-stressed, pre-cast concrete structure.

BACKGROUND OF THE INVENTION

Concrete is used in many different types of construction projects, including, but not limited to walls, retaining walls, bridges, roadways, building foundations, etc. . . . . Concrete is a composite material that is composed of coarse aggregate bonded together with a fluid cement that hardens over time. Concrete may be poured off-site in forms to obtain a concrete structure in a desired shape and then transported on-site to be installed or it may be poured on-site in field constructed forms.

It is known that most applications require one to reinforce concrete components using reinforcing members. In most cases, the reinforcing members are composed of corrosion susceptible steel, such as reinforcing bar or rebar. However, over time steel will degrade into iron oxide commonly referred to as rust. This degradation will eventually diminish the integrity of the rebar, and thus, the concrete structure. In many applications steel rebar may have a deformity, i.e., a deformed pattern that is designed to increase the friction between rebar and the material in which it is embedded.

Recent attempts to overcome the shortcomings of steel rebar utilize reinforcing bars composed of carbon fibers. In general, carbon fiber based rebar is comprised of a plurality of unidirectional glass fibers that have been reinforced or thermoset with resin. The widely accepted properties of carbon fiber strands indicate that a member with a small cross-section will perform quite well in tension, but very poorly in shear. This is a fact that was experimentally confirmed during testing of a carbon fiber rebar (CF) with parallel carbon fiber strands. It was also found that a CF sample wherein all fibers are parallel with no surface deformations does not have sufficient bond strength with a cementitious material. This fact has since been confirmed by the American Concrete Institute (ACI) (440.6-3). The ACI goes as far as to require suppliers of fiber reinforced polymer (FRP) to provide the method by which the surface of the FRP is deformed.

The deformed pattern may be replicated by "pinching" of the fibers prior to being set by the resin. However, this does not overcome the deficiencies of carbon fiber based rebar over steel rebar.

It may be further desireable to be able to attach or couple components, e.g., building components to a pre-stressed, pre-cast concrete structure. However, it is rather difficult to attach such components directly to the concrete structure. Past attempts have involved embedded a substrate into the concrete structure to which the components could then be fastened. However, during production of the concrete structure, the concrete structure will contract once the tension on the reinforcing members is released. If the embedded substrate does not contract at the same rate, then the substrate may warp and/or the concrete structure may be weakened.

The present invention is aimed at one or more of the problems set forth above.

SUMMARY OF THE INVENTION

In one aspect of the present invention, a system for allowing components to attach to a pre-cast pre-stressed concrete structure is provided. The system includes a first attachment part and a second attachment part. The first attachment part has a first body. The first body has a first concrete structure facing side and a first plurality of attachment members extending from the concrete structure facing side. The second attachment part has a second body. The second body has a second concrete structure facing side and a second plurality of attachment members extending from the concrete structure facing side. The first and second attachment parts are spaced apart forming a compressible junction therebetween. The pre-cast, pre-stressed concrete structure is formed from uncured cement, at least of a portion of the first and second attachment members being embedded in the pre-cast, pre-stressed concrete structure.

In another aspect of the present invention, a method is provided. The method includes the steps of applying stress to a reinforcing member and positioning first and second attachment parts at predetermined positions relative to the reinforcing member. The first attachment part has a first body. The first body has a first concrete structure facing side and a first plurality of attachment members extending from the concrete structure facing side. The second attachment part has a second body. The second body has a second concrete structure facing side and a second plurality of attachment members extending from the concrete structure facing side. The first and second attachment parts are spaced apart forming a compressible junction. The method further includes the steps of positioning a concrete form at a predetermined location about the reinforcing member and the first and second plurality of attachment members and pouring uncured cement in the concrete form. The uncured cement encases at least partially, the reinforcing member and the first and second plurality of attachment members. The method further including the steps of allowing the cement to cure and releasing stress from the reinforcing member.

BRIEF DESCRIPTION OF THE DRAWINGS

FIGS. 1C through 24C are diagrammatic illustrations of a reinforcing bar, rod or member and/or structures used in the production of a reinforcing bar, rod or member, according to embodiments of the present invention;

FIGS. 25-31 are diagrammatic illustrations of systems for allowing (building) components to attach to a concrete member, according to embodiments of the present invention.

DETAILED DESCRIPTION OF THE INVENTION

Figure 1A:
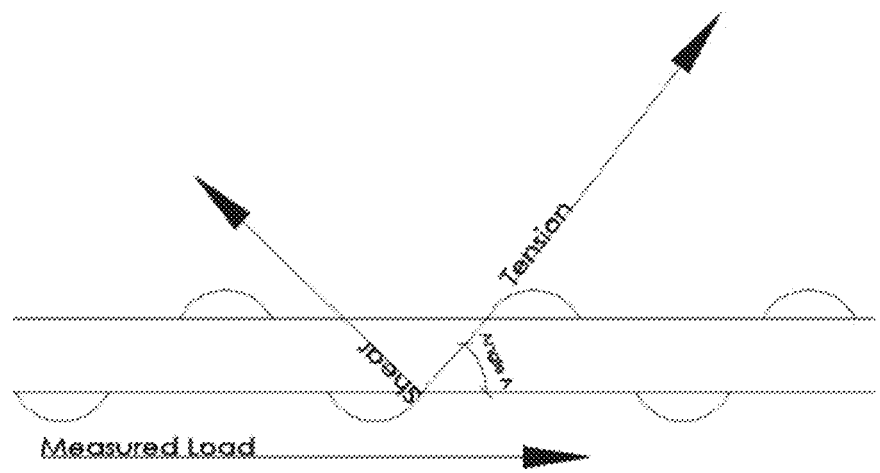
FIGS. 1A and 1B are explanatory diagrams of parameters associated with an exemplary reinforcing rod associated with the present invention.

With reference to the drawings, and in operation, the present invention is related to reinforcing bars and/or concrete structures with reinforcing bars. The reinforcing bars may be resin impregnated carbon fibers. In particular, the present invention may be related to systems, methods and apparatus, related to the formation and use of resin impregnated carbon fibers and/or methods and structures to apply tension or stress to reinforcing bars and/or methods or structures related to the production of concrete structures.

In general, in one aspect of the present invention, a reinforcing bar composed of carbon fiber strands is provided. In another aspect of the present invention, a system and method for producing reinforcing bar composed of carbon fiber strands is provided. In still another aspect of the present invention, an apparatus for producing reinforcing bar composed of carbon fiber strands is provided. It should be noted that the terms reinforcing bars, reinforcing rods and reinforcing members may be utilized interchangeably.

For a product to perform in a manner acceptable for this application, a given amount of surface deformation must be created during the manufacturing process. It is vital that this deformation creates enough mechanical bond with a cementitious material without increasing the shear in the fiber beyond an unacceptable yield point as the force is applied.

The carbon fiber based reinforcing bar may be composed from a plurality of carbon fibers which are wound or twisted and then set in a resin. For example, in one embodiment, three strands of approximately 50,000 carbon fibers each are twisted together and then set (or thermoset) in a resin. The twist forms the deformations or deformation pattern that provides the friction between the rebar and the material in which the rebar is set. In one embodiment, the number of twists per a given length of the carbon fibers is predetermined and determined as a function of the number and size of fibers and/or strands of fibers.

In one aspect of the present invention, each strand of carbon fibers may be composed from a tow of carbon fiber filaments. Each tow of carbon fiber filaments has an approximate predetermined number of carbon fiber filaments. Typical, tows may have 20,000; 30,000; 40,000, 50,000 or other approximate number of filaments. In general, the critical parameter is the overall strength of the resulting reinforcing bar, rod or member. The size of each filament and the number of filaments in different tows may differ. Therefore, based on the size of the filaments, the (approximate) number of filaments in each tow and the desired strength of the resulting member, rod or bar, the number of strands may be determined. It should be further noted that in some embodiments, a single tow may be used. In these embodiments, the single tow may be considered as including two or more strands. The two or more strands in the single two are twisted to create the non-uniform surface (see below).

With reference to FIG. 1A, the relationship between the number of twists (angle A) and the shear and tension loads is shown. From the diagram, it is clear that as the angle A increases due to increasing the number of twists per length of the fibers/strands, the shear load will increase as well [Shear=Tension(tan(A))]. Because the ultimate shear strength of a carbon fiber is considerably less than the ultimate tensile strength, the transfer of tensile load into shear load will become a limiting factor in the ultimate failure strength of the material. FIG. 1A illustrates the transfer of tensile load into shear load. This can be described as Measured Load*(sin(A)). It should also be noted that the tension in the fibers at this location is described as Measured Load*(COS(A)).

Figure 1B:
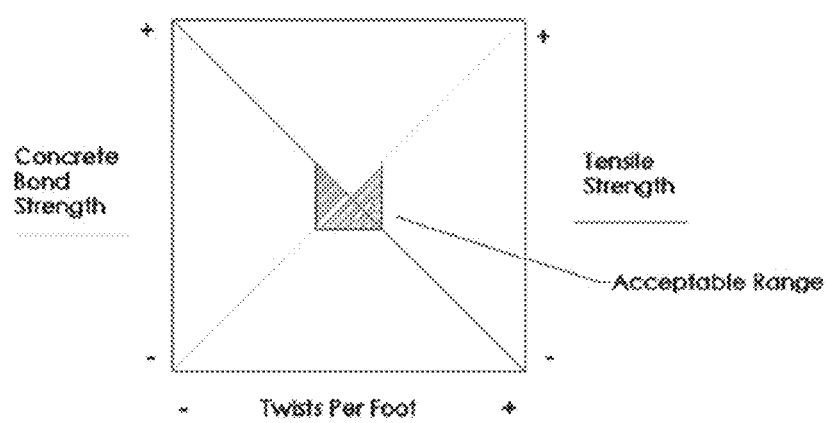
Figure 1C:
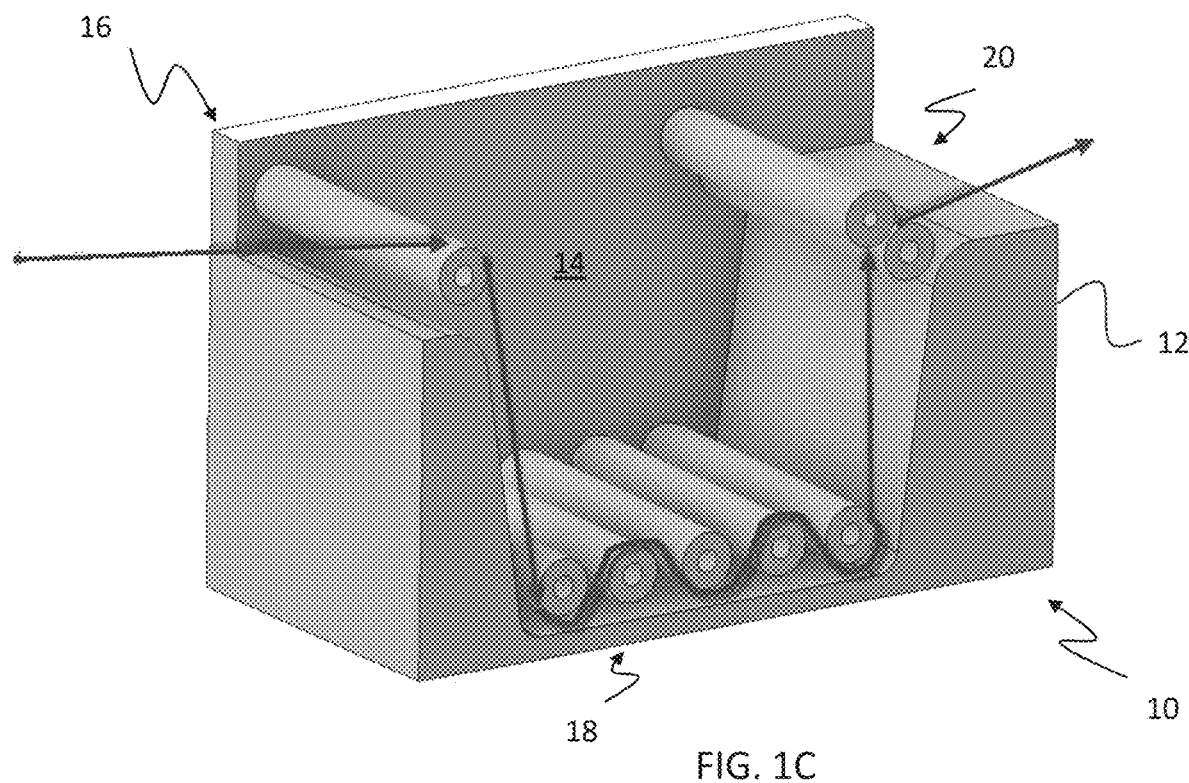
Figure 1D:
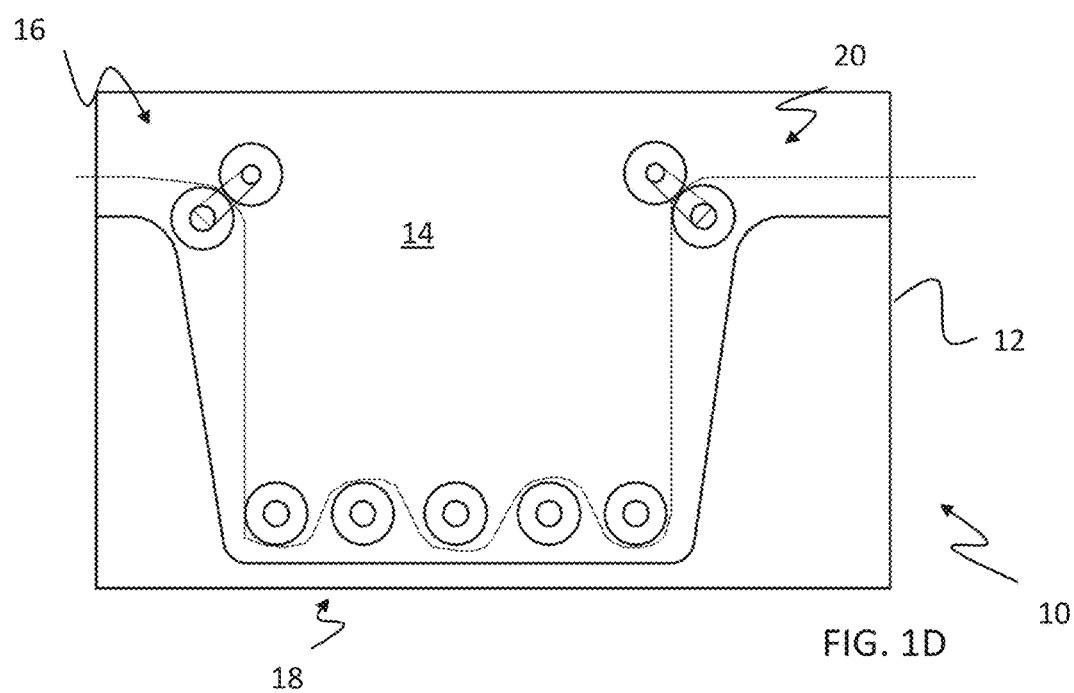
Figure 1E:
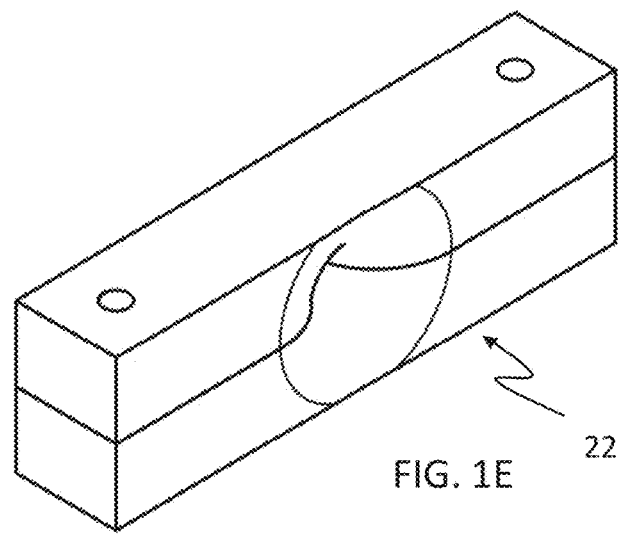
Figure 1F:
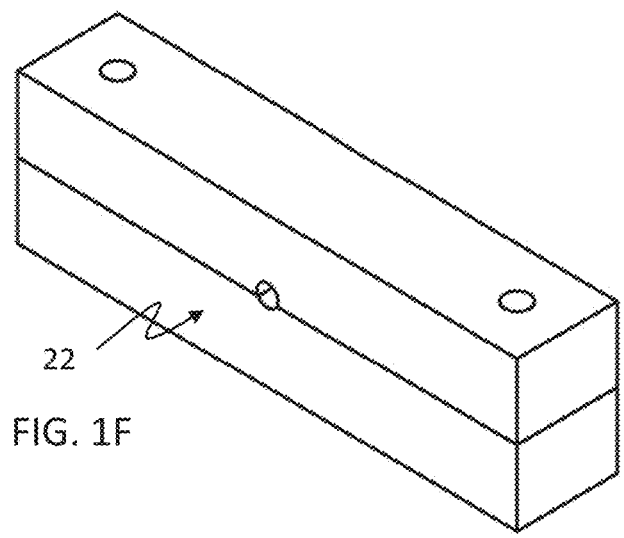
Figure 1G:
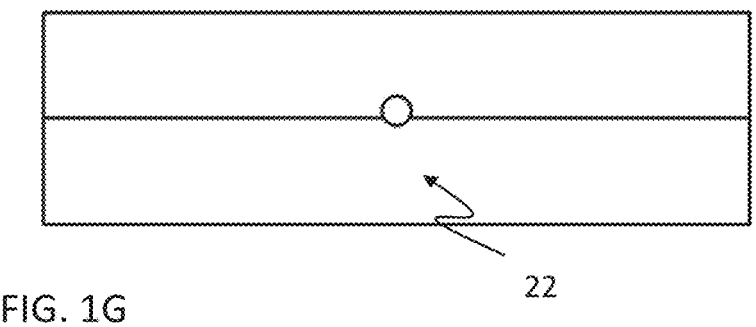
Figure 2A:
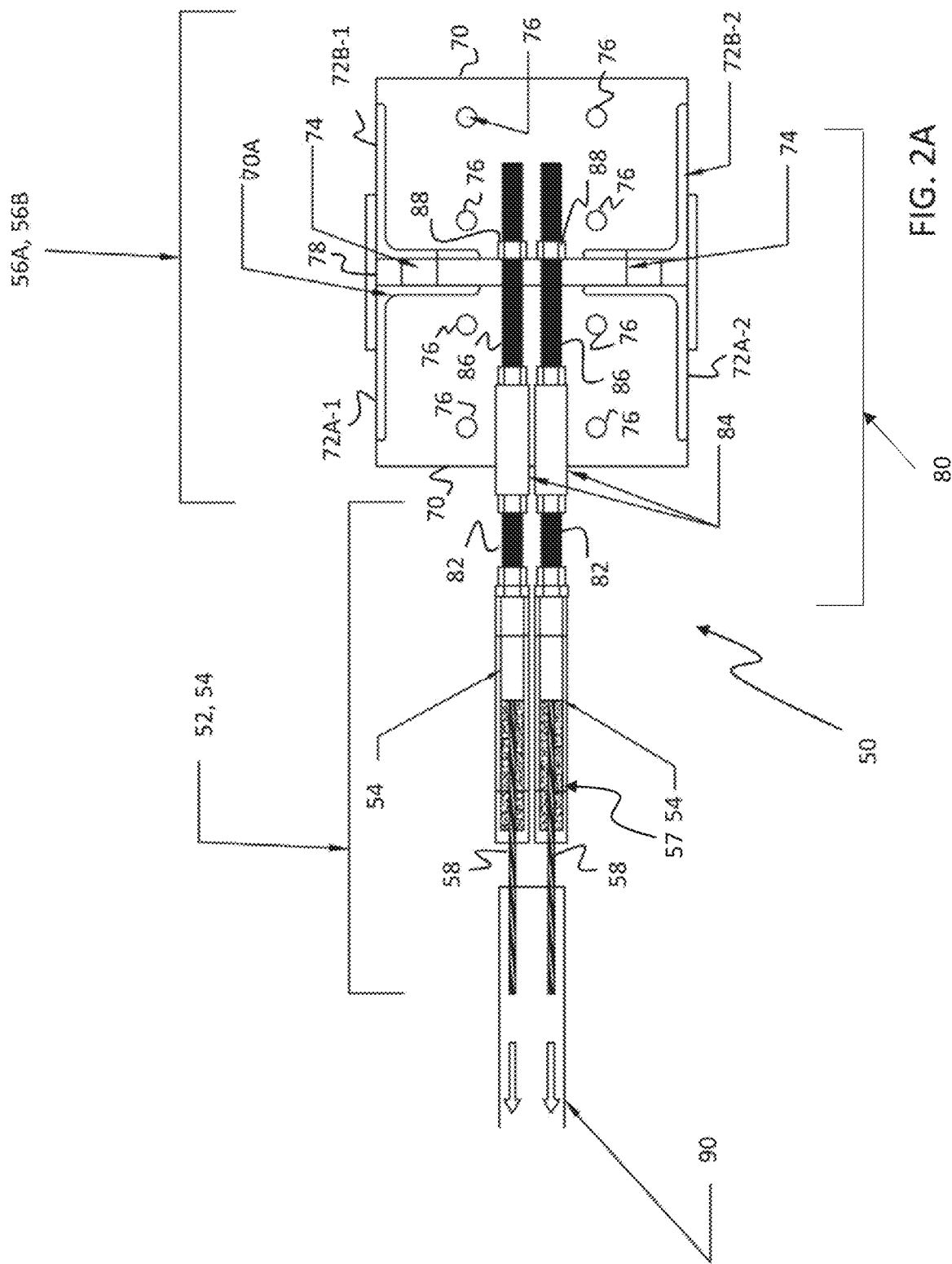
Figure 3:
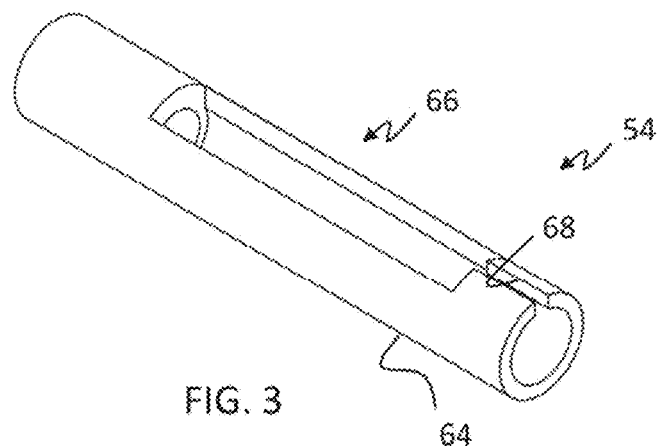
Figure 4:
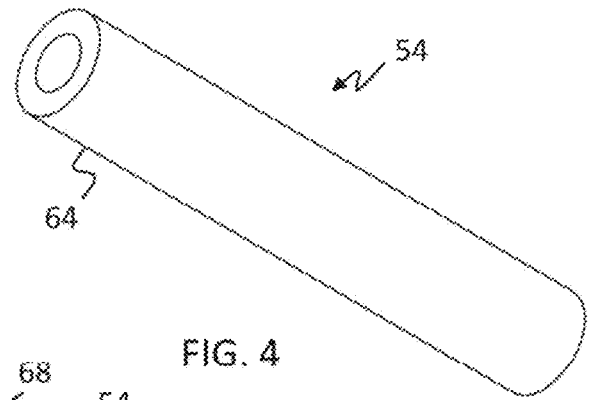
Figure 5:
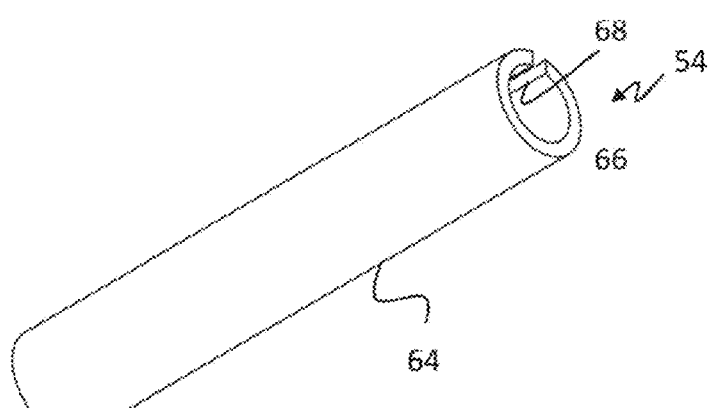
Figure 6:
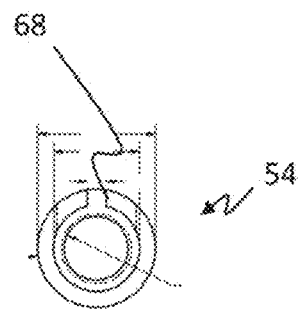
Figure 9:
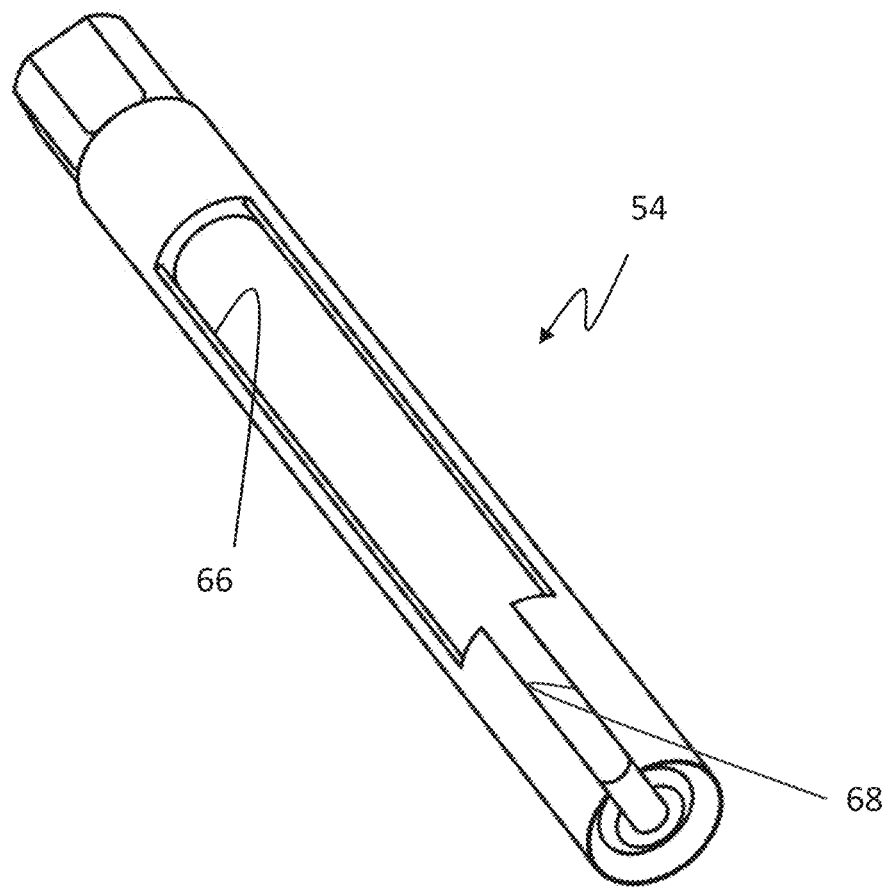
Figure 10:
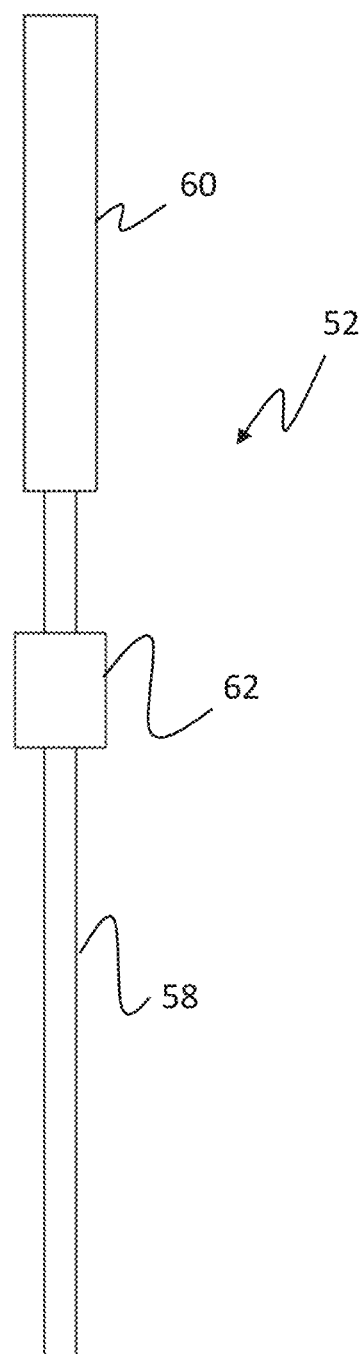
Figure 11:
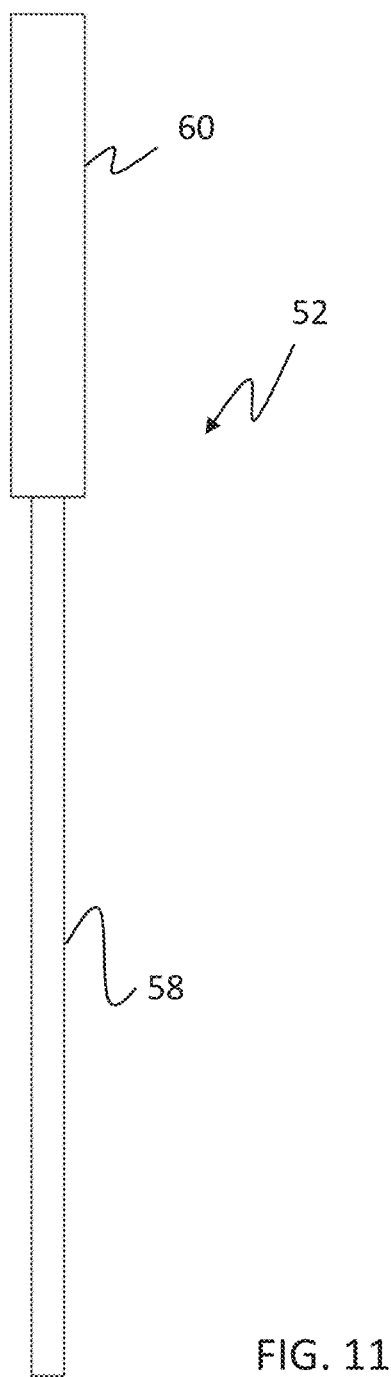
Figure 12:
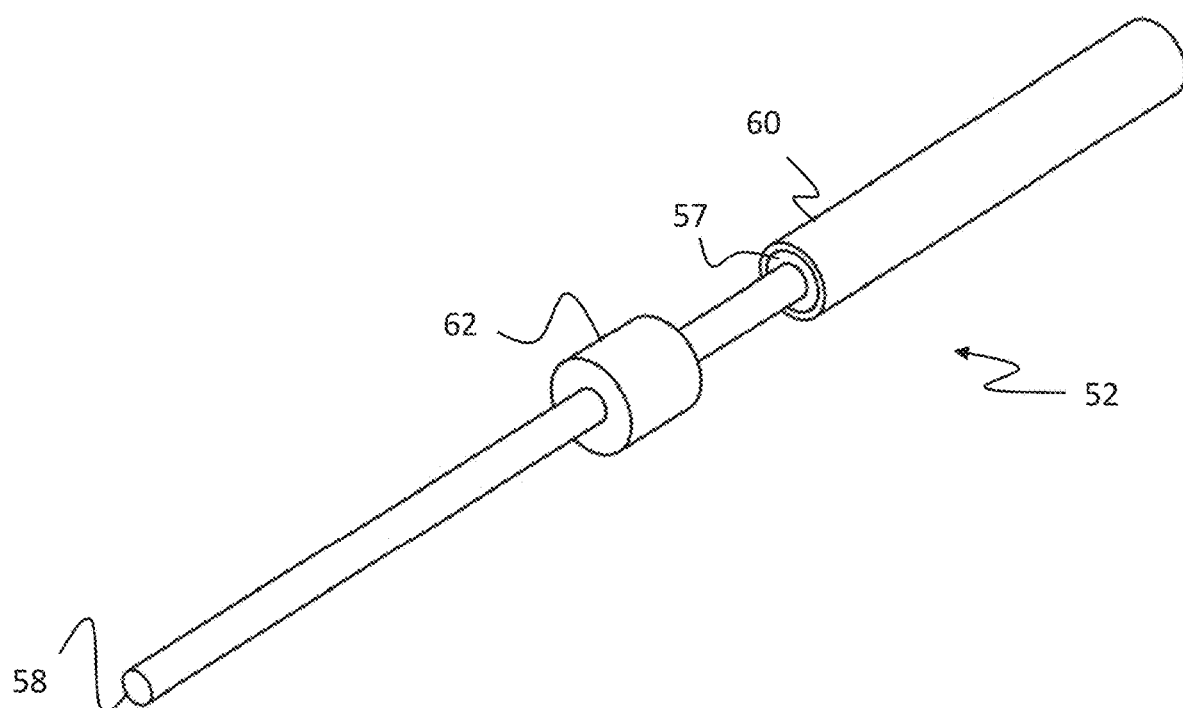
Figure 13:
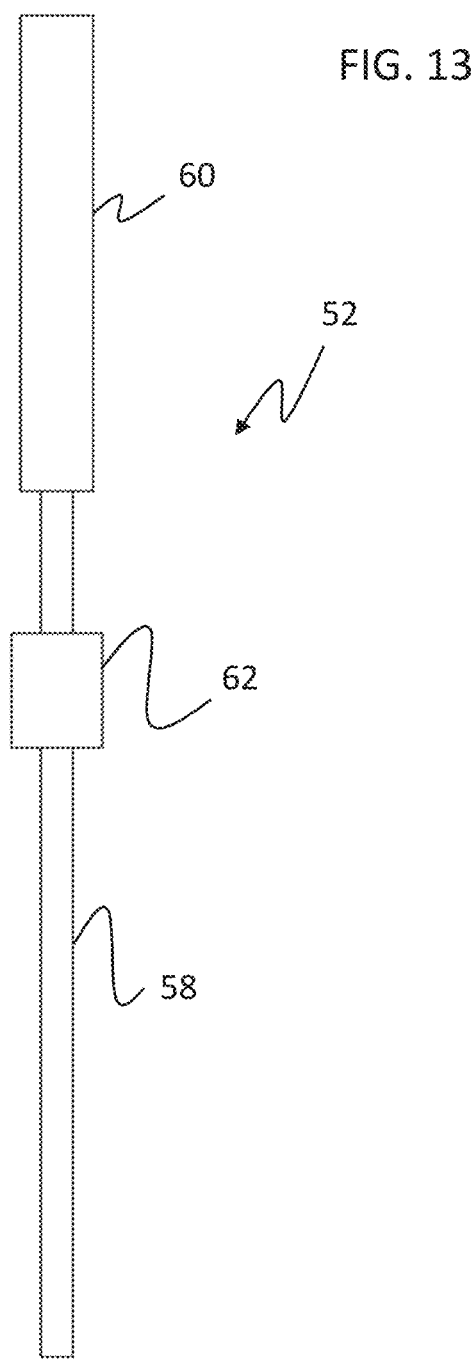
Figure 14:
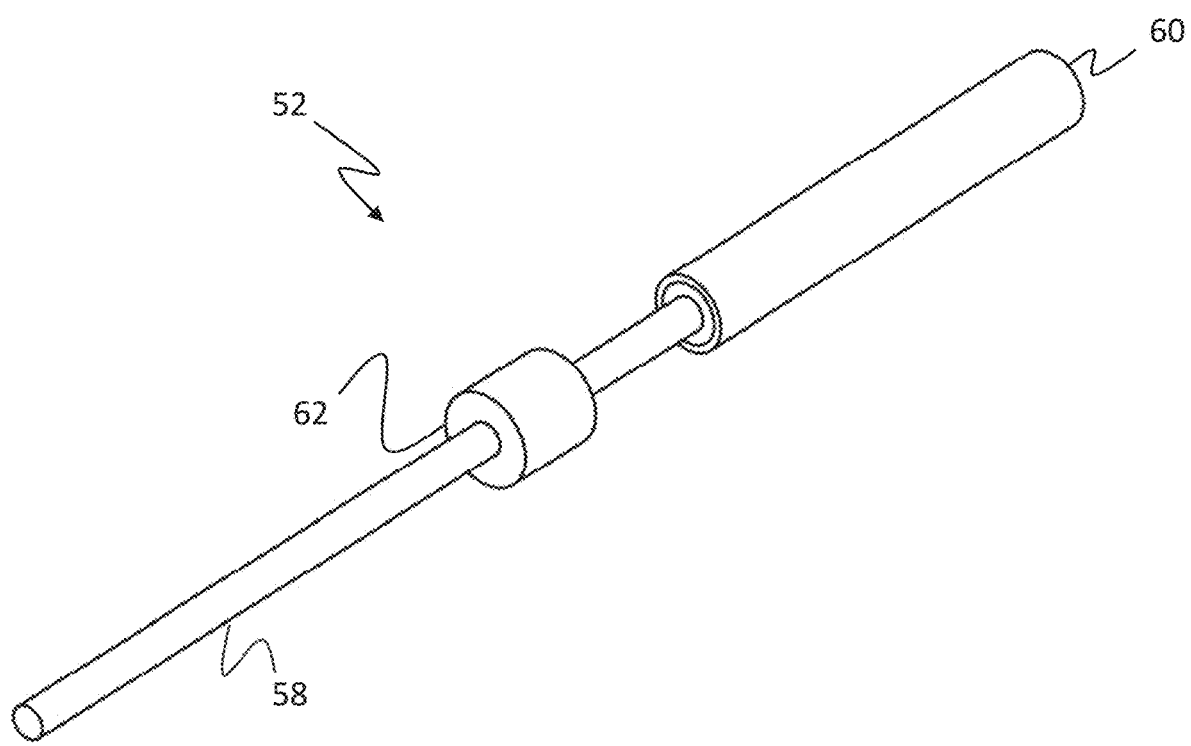
Figure 15:
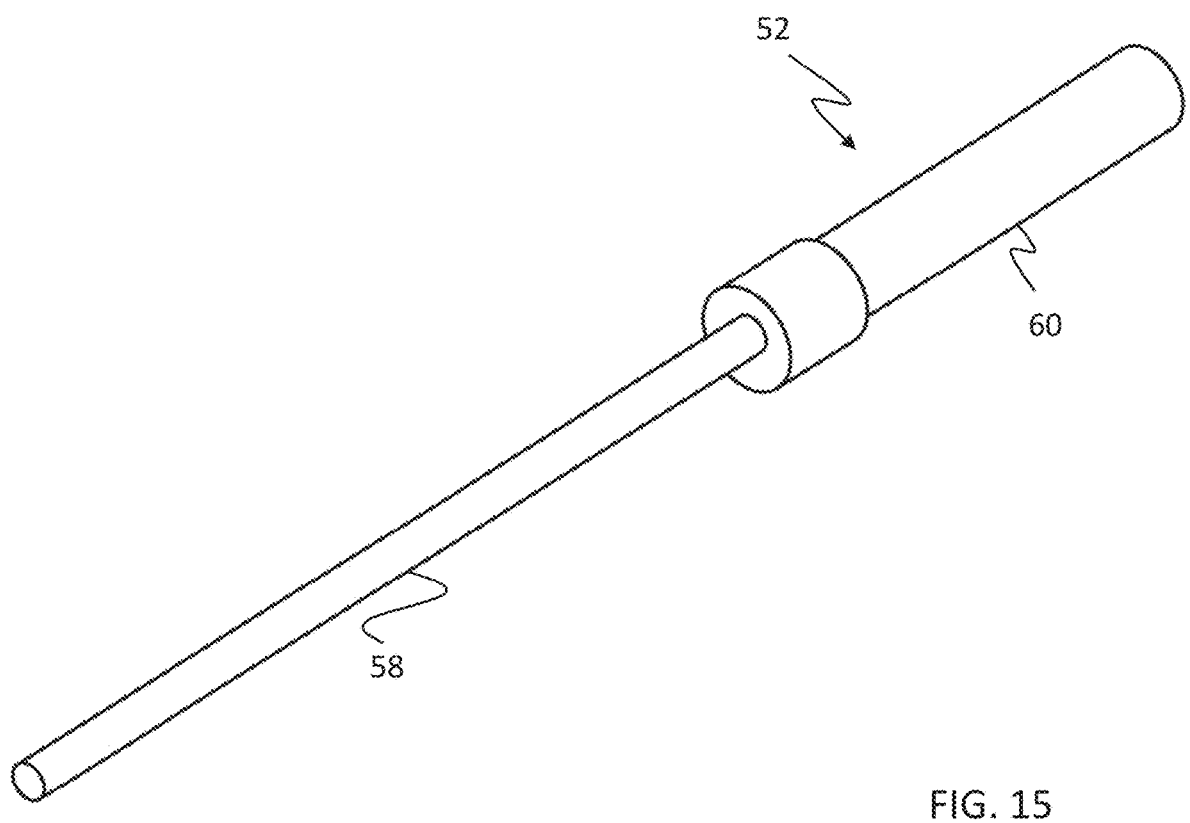
Figure 16:
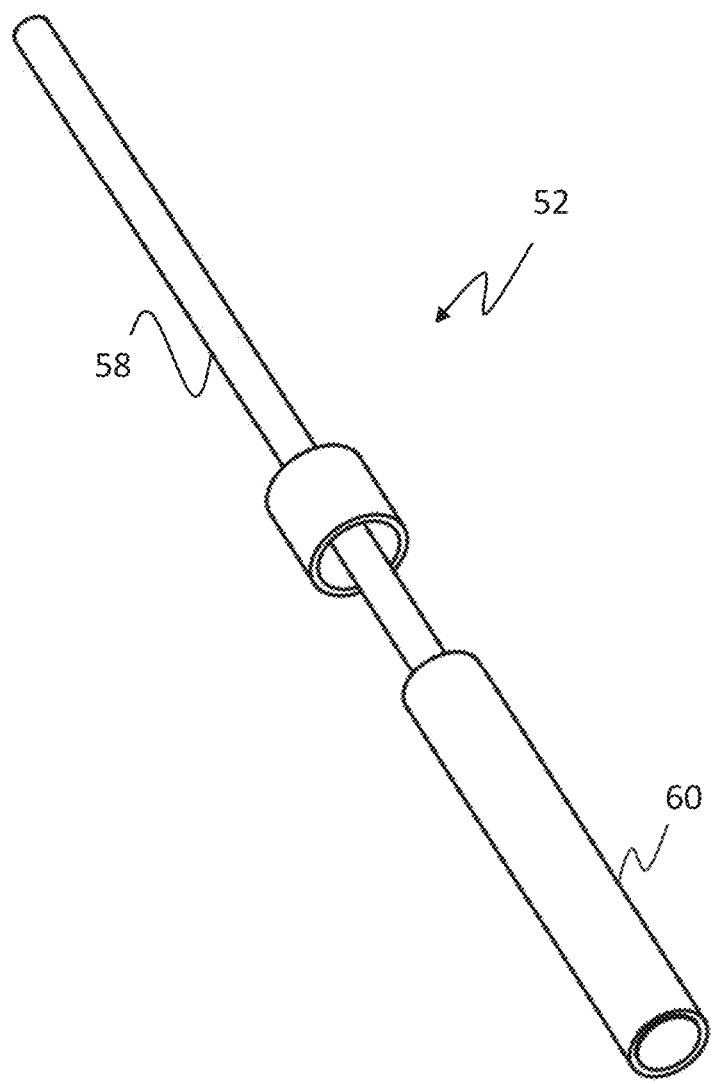
Figure 17:
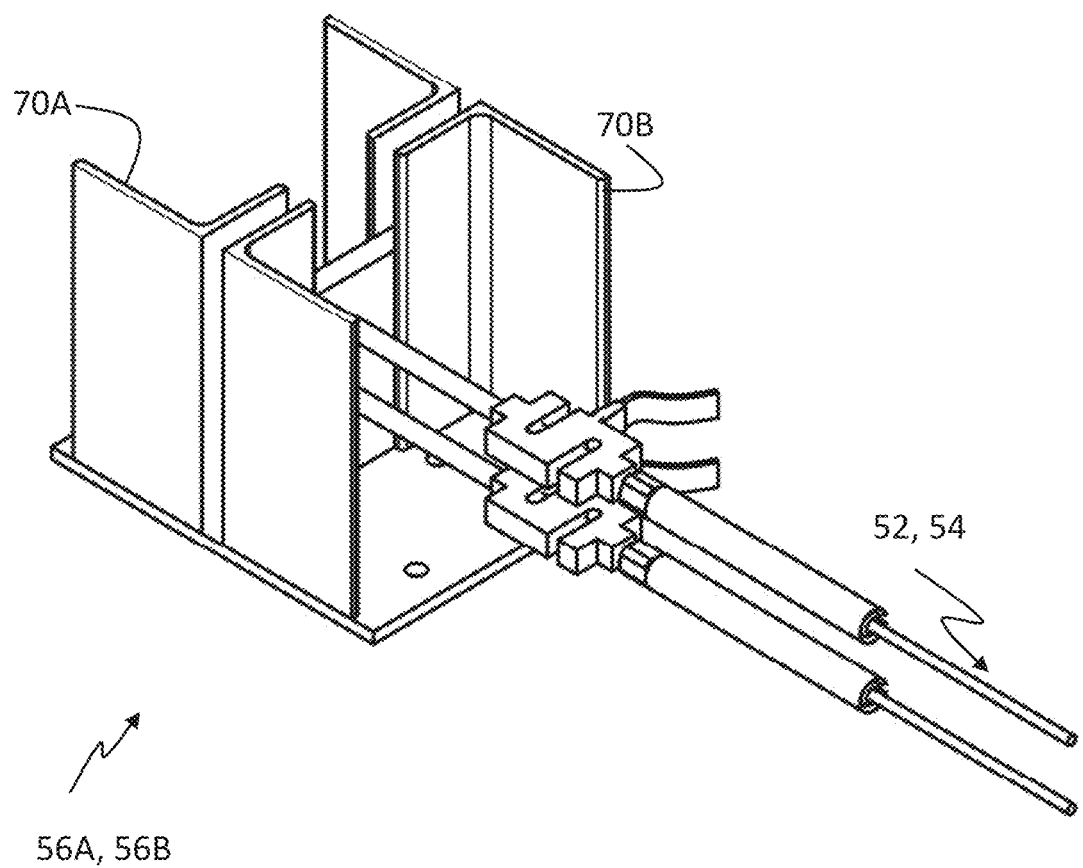
Figure 18:
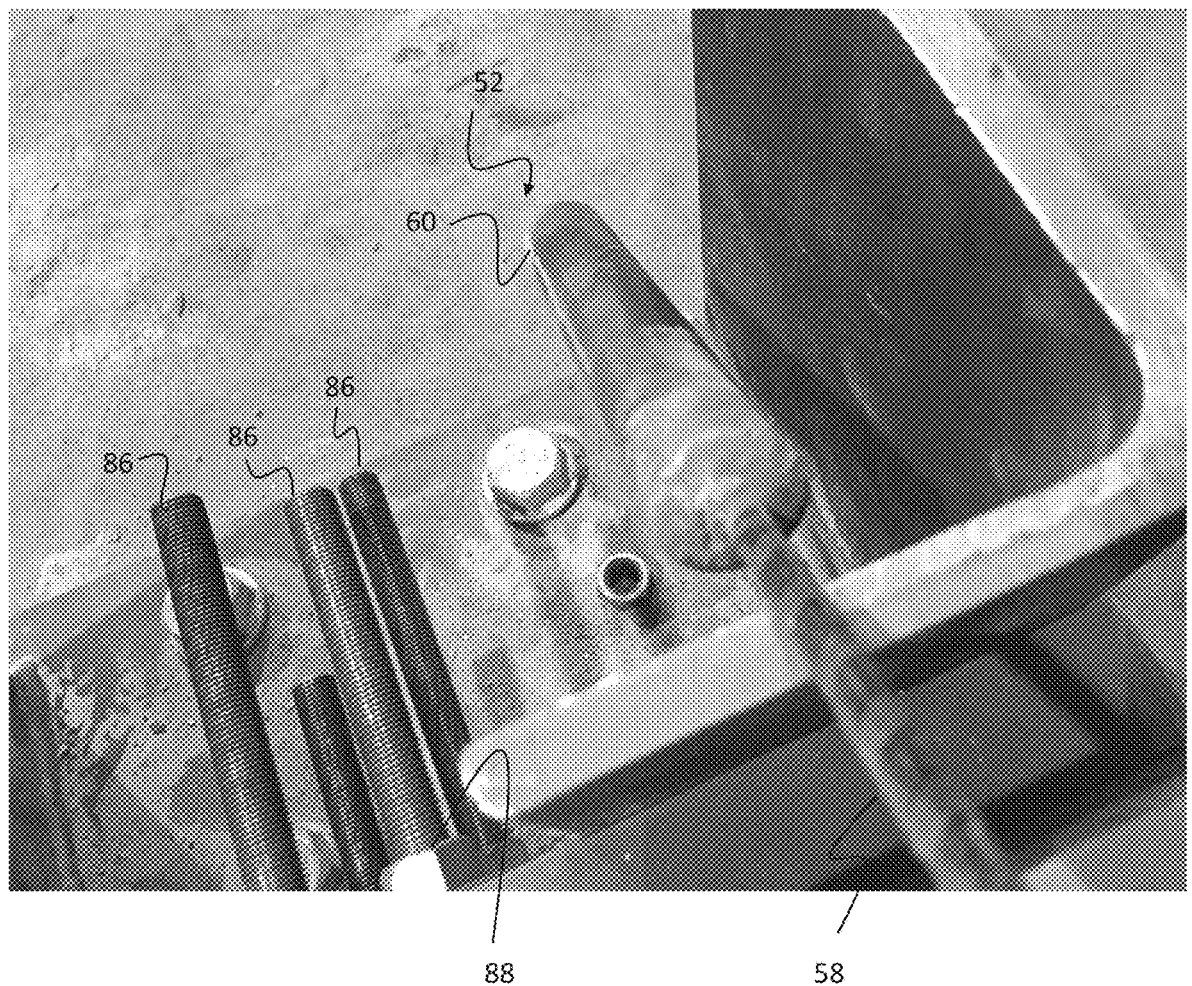
Figure 19:
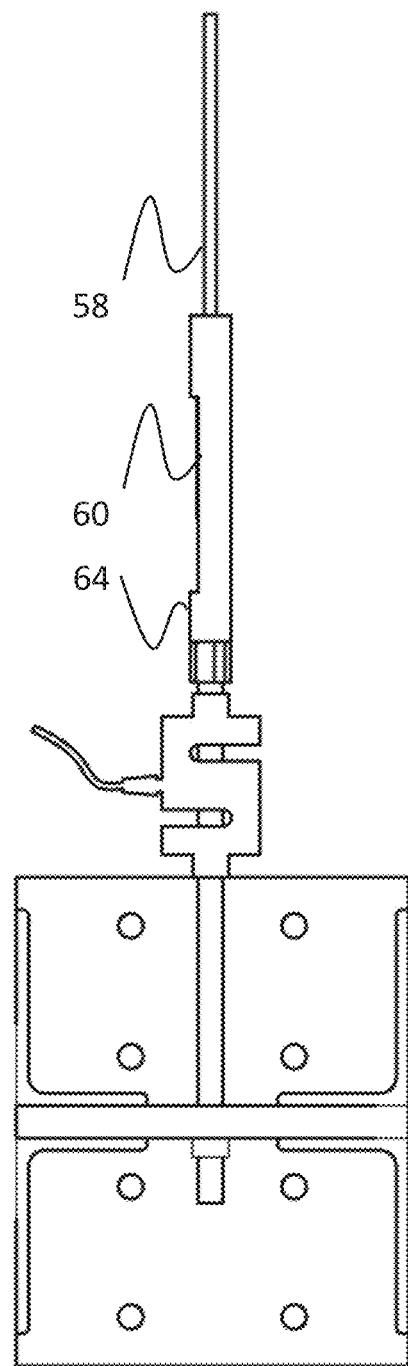
Figure 20:
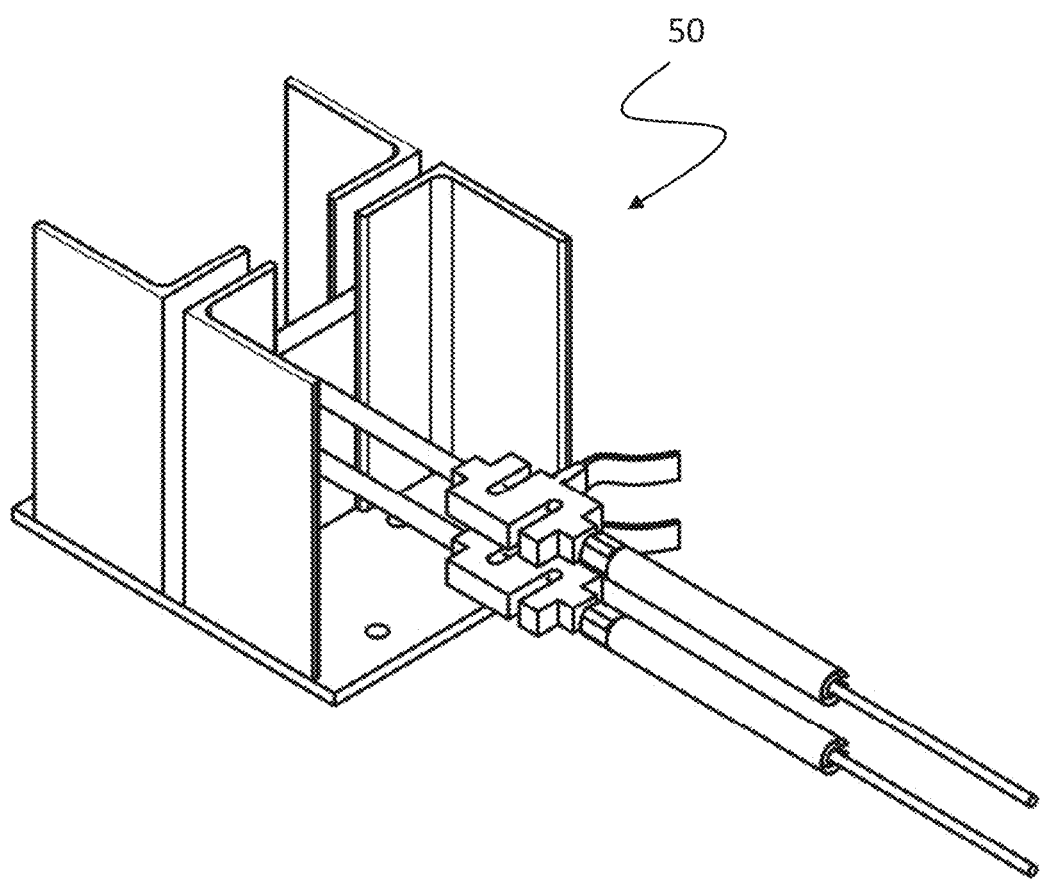
Figure 21:
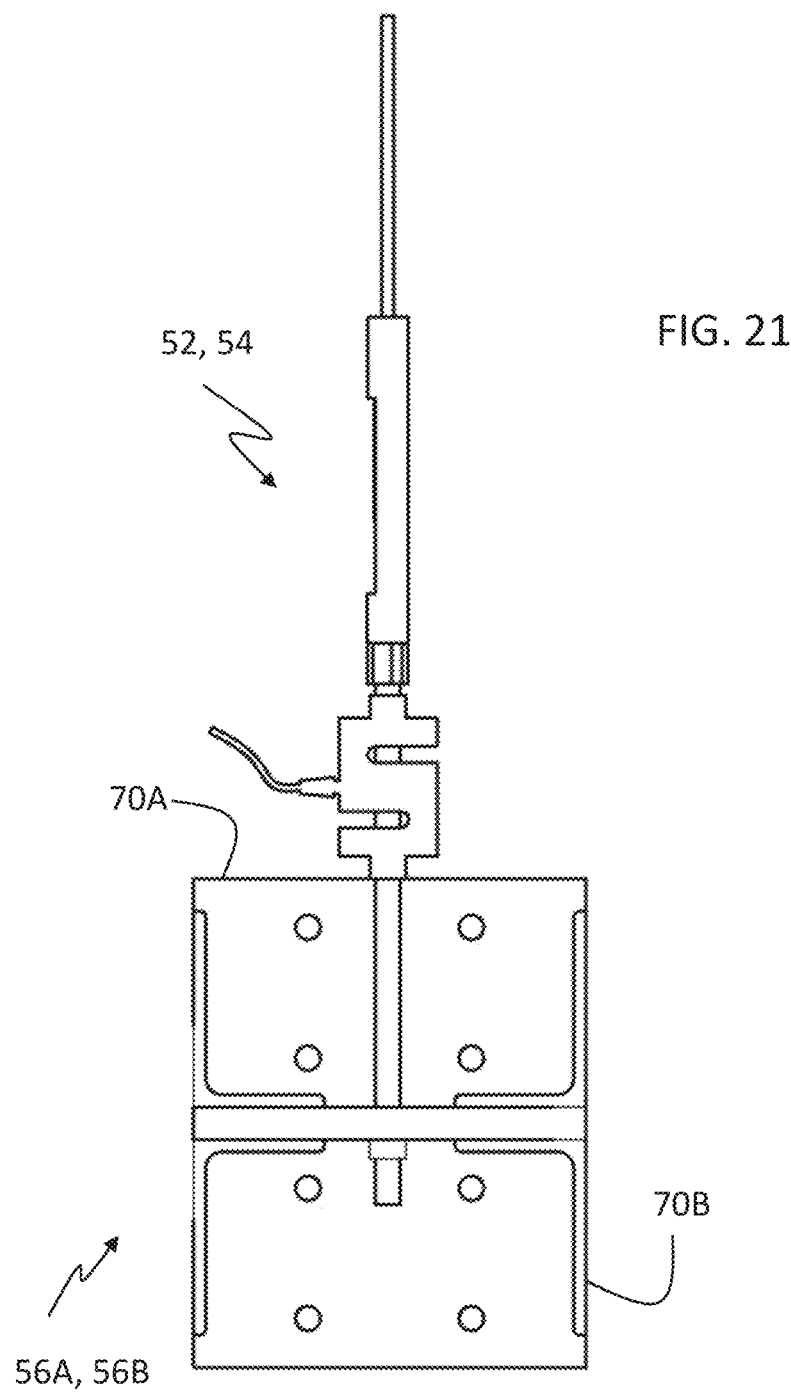
Figure 22:
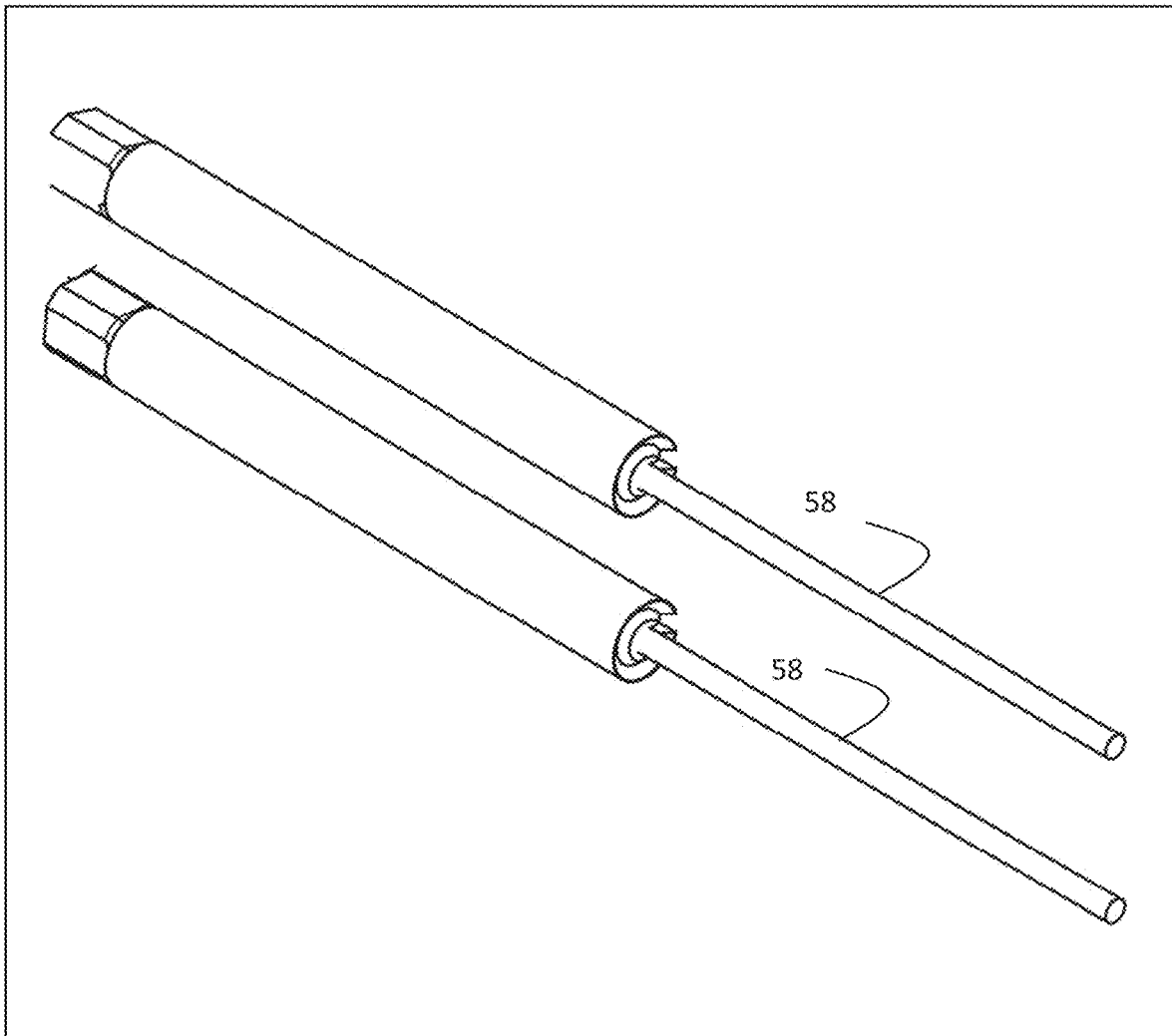
Figure 23:
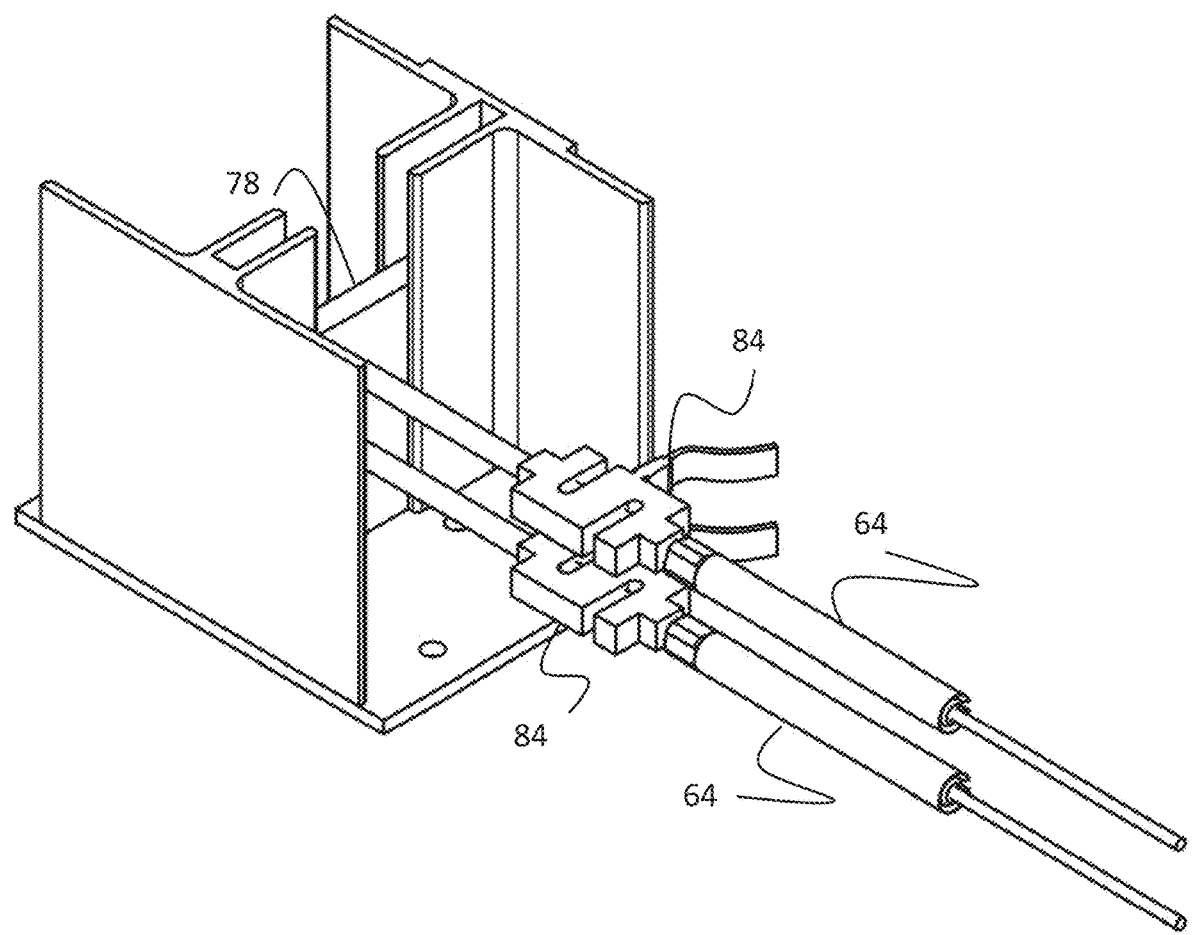
Figure 24A:
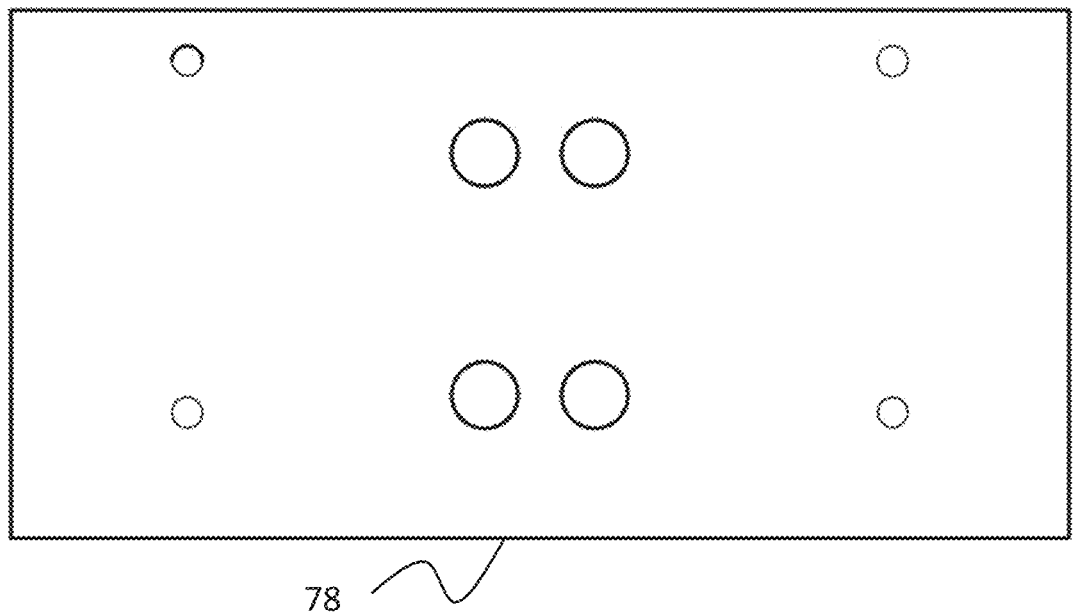
Figure 24B:
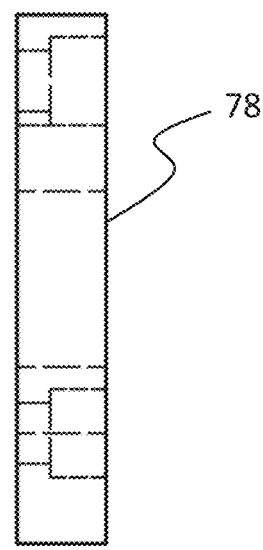
Figure 24C:
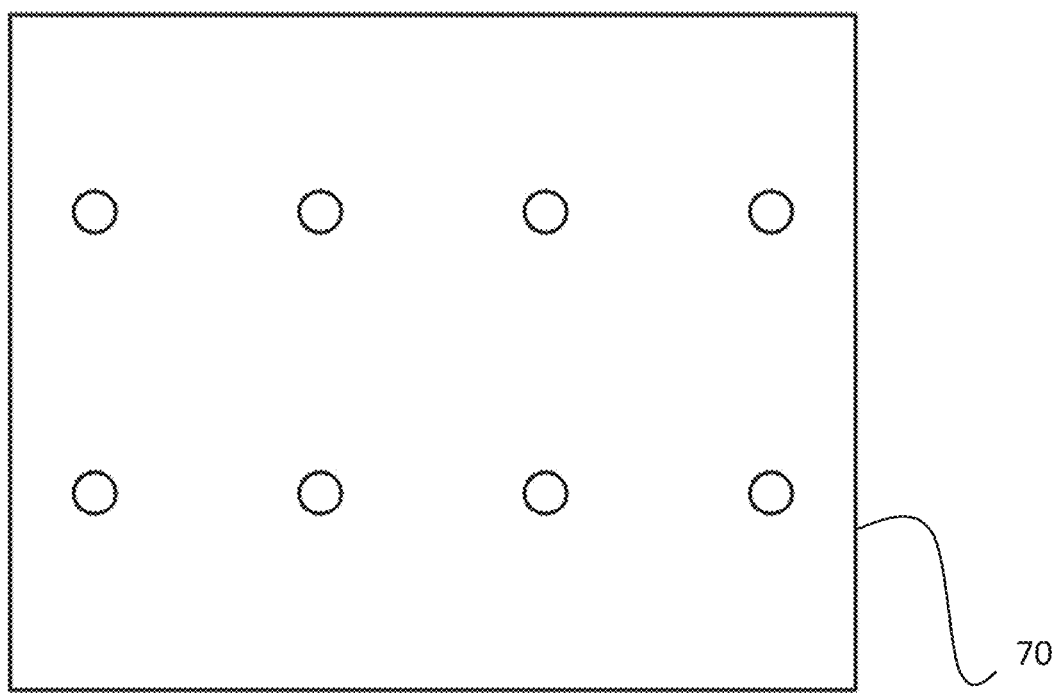

With reference to FIG. 1B, there is a range in the number of twists per linear foot of carbon fiber wherein both the bond strength and the effective tensile strength are acceptable. It is within this range of twists per foot that all carbon fiber must embody in order to provide adequate mechanical bond, yet efficiently carry tensile load without inducing detrimental shear loads.

In general, the carbon fiber based reinforcing bar (rebar) is formed by pulling carbon fibers (under tension) through a resin bath and simultaneously, or shortly thereafter, twisting the fibers. The resin impregnated twisted carbon fibers are then left under tension while the resin cures.

With reference to FIGS. 1C, 1D, 1E, 1F and 1G, an apparatus 10 used in the formation of the carbon fiber based rebar, according to an embodiment of the present invention, is shown. The apparatus 10 includes a bath housing 12 (which is shown in cross-section in FIGS. 1C and 1D). The bath housing 12 forms a reservoir 14. In use, the reservoir 14 is filled with (uncured) resin.

As shown, the apparatus 10 includes at least one incoming roller 16, a series of bottom rollers 18 and a pair of outgoing rollers 20. As shown by the arrows, aligned carbon fibers enter the apparatus 10 (from the left in FIG. 1C) and are directed over the incoming roller 16. The fibers are then directed towards (into the resin bath) and around the bottom rollers 18. As the fibers leave the resin bath, the fibers are pulled through the outgoing rollers 20.

In one embodiment, the carbon fibers are in the form of a strand of a plurality of carbon fibers. In a specific embodiment, three strands of 50,000 carbon fibers each are used.

The three strands are pulled (or pultruded) through the resin bath simultaneously and after the fibers leave the resin bath, are twisted together. A more specific system and method is described below.

First, the (dry) carbon fiber is pultruded through a series of rollers 16, 18, 20 under a constant tension in a resin bath in order to ensure complete impregnation of the resin through all fiber strands. After all of the fibers are saturated with resin, they are pultruded through a single slot 22 (which may be located in a block mounted adjacent the bath housing 12) to remove excess resin (see FIG. 1E). This step also ensures all of the fibers are aligned and that the cross-sectional area of the strand is within the acceptable range for the given (or intended) application. This step also ensures that the ratio of CF to epoxy is appropriate. The fibers are then left under a tension load which keeps all fibers aligned during curing. Generally, the block (shown in FIG. 1D) will include a slot for each strand of fibers.

At this point, one end of the strand is fixed while the other end is twisted a predetermined number of times until it is within the range of twists per linear foot required for the intended application. After the twisting process is complete, both ends of the fiber are fixed and the strand is cured while remaining under tension. In one aspect of the present invention, the predetermined number of twists is determined as a function of the number and size of the carbon fibers and/or number and size of the strands of carbon fibers. In another aspect of the present invention, the predetermined number of twists may be determined as functions of the shear load required of the reinforcing rod, bar or member.

The process of twisting this strand a pre-specified number of times results in a consistently non-uniform surface on the strand, which greatly increases the bond strength between the strand and a cementitious material. Without this added non-uniformity, the strand would possess little or no mechanical bond strength with cementitious materials. This is vital as the chemical bond between cement and the types of resin used is effectively non-existent.

The strand is allowed to cure per resin manufacturer's suggestion, at which time it is ready to be used in production. Again, it is important to note that the strand remains under load during the curing process and that the twists are applied to the strand before the curing process begins.

Another important factor in the manufacture of carbon fiber strands is predictability of performance. It is vital that the production process produces a strand that has consistent properties in both bond strength and ultimate tensile strength. The design values used for both of these factors should reflect the distribution of tested data points. That is to say that the design value should not be greater than the lower bound of the first standard deviation of the data set.

After the resin impregnated carbon fiber based rebar has been cured, the rebar is ready to be used. In one aspect of the present invention, the carbon fiber based rebar may be brought under tension and a cement structure is formed around the pre-stressed fiber based rebar. Once the concrete has cured, the tension force from the rebar may be released.

With reference to FIGS. 2A-16, a system 50 for pre-stressing a reinforcing member within a pre-cast structure is shown. The system 50 is particularly useful in pre-stressing a fiber base reinforcing member, such as a carbon fiber based rebar. A carbon fiber based rebar as detailed above with respect to FIGS. 1A-1D may be used. However, it should be noted that the system 50 may be used with any fiber based reinforcing bar.

In general, the system 50 includes three main components: a gripping device 52, a tension device 54 and a tension application sub-system 56 (A & B).

With particular reference to FIGS. 10-14, the gripping device 52 is used to provide an attachment to each end of a reinforcing member (or rebar) 58. In the illustrated embodiment, the gripping device 52 includes a gripping tube 60, such as a steel tube 60. The gripping tube 60 has a calculated length, outer diameter and inner diameter. The parameters of the gripping tube 60 are determined to provide enough friction force between the gripping tube 60 and the reinforcing member 58 given the tension force that needs to be applied while the pre-cast structure is being cast (see below).

The gripping tube 60 is then filled with an expansive grout 57. A cap 62 (see FIGS. 13 and 14) with a pre-drilled hole in the center to guide the reinforcing member 58 is then placed on the gripping tube 60. Cap 62 is multi-functional in that it contains the expansive grout 57 as well as ensures that reinforcing member 58 is concentric with gripping tube 60. The reinforcing member 58 is then inserted through the cap 62 and into the grout 57. Upon curing, the expansive grout 57 creates a bond on both the reinforcing member 58 and the inside of the gripping tube 60. This bond becomes a friction force upon the application of tension to the gripping tube 60 (one on each end of the reinforcing member 58) by the system 50. The friction force is a function of the gripping tube 60, e.g., the length and diameter(s) of the gripping tube 60, as well as the grout 57. The gripping tube 60 is designed such that the friction force has an ultimate strength greater than the tension force applied to the structure allowing the gripping tube 60 to be used as an attachment point for the tensioning process. It is important to note that the outer diameter of the grout tube is also limited by the designed distance between the reinforcing members 58. The outer diameter of the tubes 60 must be smaller than the centerline distance between the reinforcing strands to ensure that the tubes 60 for each member 58 do not inhibit one another. The same principal applies to the next part in the tension system 50, as well.

With particular reference to FIGS. 3-9, in the illustrated embodiment, the tension device 54 includes a tension tube 64, allows the tension application sub-system 56 to quickly and easily be attached to the gripping device 52. The tension tube 64, which may also be made of steel, has a specified length, outer and inner diameter such that the gripping tube 60 fits inside. The size of the tension tube 64 is determined such that the outer diameter of the gripping tube 60 is smaller than the inner diameter of the tension tube 64. The outer diameter of the tension tube 64 is also limited by the designed distance between the reinforcing members 58 (see above). That is, the outer diameter must be smaller than the centerline distance between the reinforcing members 58 to ensure that the gripping tubes 60 and tension tubes 64 for each strand do not inhibit one another. If this dimension were to become a limiting factor in the design of the reinforcing element location another tension application system would have to be designed to accommodate.

With particular reference in FIGS. 3-9, an insert slot 66 is machined out of the top of the tension tube 64. The insert slot 66 allows the gripping tube 60 to be inserted quickly without compromising strength and reducing the amount of time necessary to remove the tension tub and reinstall the next new tension tube for reinforcement bar tensioning. A smaller slot 68 allows the member 58 to also be inserted into the tension tube 64. One end of the tension tube 64 is (at least partially) closed (see FIG. 9) and includes the smaller slot 68 that allows the reinforcing strand to extend therethrough when the grout tube is inserted into the tension tube. The opposite end to the tension tube 64 may be threaded (not shown) to allow the attachment of a threaded rod (see below) which connects tension device 54 to be connected to the tension application sub-system 56. A tension tube 64 may be used at both ends of each reinforcing member 58 such that tension can be adjusted at either end.

With reference to FIGS. 2A-2B and 17-24, the tension application sub-system 56 includes a first tension application apparatus 56A and a second tension application apparatus 56B, one at each end of the members 58. While only one tension application apparatus 56A, 56B is shown, the other apparatus 56A, 56B is identical. As will be explained in more detail below, the tension within the members 58 may be adjusted at either end through the respective tension application apparatus 56A, 56B. It should be noted that in the top down diagrams of FIGS. 2A and 2B, two members 58 are shown. However, in the illustrated embodiment, four members 58 are used.

Returning to FIGS. 2A-2B and 17-24, in the illustrated embodiment, each tension application apparatus 56A, 56B includes first and second assembly brackets 70A, 70B. The first and second removable brackets 70A, 70B, each include a base 70 with a plurality of through holes 76. The tension application apparatus 56A, 56B may be mounted, e.g., bolted, to a surface (see for example, FIGS. 24A, 24B and 24C) via the through holes 76.

The first and second assembly brackets 70A, 70B may be fixed together using bolts (not shown) through alignment holes 74 in respective upright corner walls 72A-1, 72A-2, 72B-1, 72B-2. An interchangeable, removable plate 78 is provided between the first and second assembly brackets 70A, 70B.

For each gripping device 52/tension device 54 pair, a coupling mechanism 80 is provided. The coupling mechanism 80 couples the respective gripping device 52/tension device 54 pair to the tension application apparatus 56A, 56B.

In the illustrated embodiment, the coupling mechanism 80 includes a first threaded rod 82. A first end of the first threaded rod 82 is threaded into a threaded aperture in the opposite end of the tension tube 64 of the tension device 54 (or otherwise coupled thereto). The opposite end of the first threaded rod 82 is threaded into one end of a respective load cell 84 (or otherwise coupled thereto). A second threaded rod 86 is threaded into a second end of the respective load cell 84. The opposite end of the second threaded rod 86 is inserted through a respective hole in the plate 78. An adjustment nut 88 is threaded onto the opposite end of the second threaded rod 86. Rotation of the adjustment nut 88 controls the tension or force applied to the respective member 58. The tension imposed on the members 58 causes a deflection (in either direction) within the respective load cell 84 which may be measured.

In use, once both ends of the tension application subsystem 56 are fixed, torque is applied to this adjustment nut 88, resulting in a tension load being created in the reinforcing member(s) 58. The assembly brackets 70A, 70B hold the plate 78 in place and are securely fastened to a true and secure surface with adequate structural capacities. The assembly brackets 70A, 70B are coplanar to ensure that the reinforcing members 58 under tension are level. An integral portion of the bulk head is the plate through which the threaded rods are inserted and the adjustment nut(s) 88 tightened against. The bulk head is designed such that this plate 78 is removable for quick and easy alteration of the reinforcing strand locations.

In the illustrated embodiment, the pre-cast structure is formed using a form shape or mold 90. The members 58 extend from the first tension application apparatus 56A, through the form 90, to the second tension application apparatus 56B.

The first step is to place all reinforcing members 58 required for the pre-cast structure into the form 90 with the gripping tubes 60 in the respective tension tubes 64. Tension is then applied to the system via the adjustment nuts 88 and set to the proper torque to yield the correct value in tension. The cementitious material may be then poured into the form 90, around the reinforcing members 58. Tension is again verified before the cementitious material is left to cure. After the material is cured to the proper strength, the tension is systematically released at an equal rate among all reinforcing members 58. At this point, the gripping tubes 60 may be cut off (and disposed of) and the member is removed from the form 90. The forms 90 can be cleaned and the system 50 prepared to begin the process over again.

The dimensions chosen for the prototype concrete member were governed by the dimensional, and load bearing requirements of the chosen construction system, the ACI cover depth requirements for reinforcing members 58, and load capacity of reinforcing members 58. The ACI requires a minimum cover depth based on reinforcing member material and corrosive properties. That is to say there is a minimum distance from the surface of the concrete member to the closest surface of the reinforcing element. It is important to note that the cover depth for a composite fiber reinforcing element is less than that of a steel reinforcing element due to the difference in corrosive properties. This requirement shows that a member reinforced with a composite element could have a thinner cross sectional area than one reinforced with steel. For example the minimum cover depth for a steel member is 0.75", therefore a member with a single 0.25" reinforcing element could only be 1.75" thick at the minimum. Whereas a composite member requires 0.375" of cover therefore the same size reinforcing element could yield a member 1" thick. It was this principal along with the engineered load rating for the member that would govern the dimensions chosen for the prototype composite reinforced, precast, pre-stressed concrete member.

Method to Attach Block, to a Precast/Pre-Stressed Concrete Member

In some applications, it is desirable to attach a different type of material, e.g., wood, to a precast concrete structure. For example, it may be desirable to use the precast cement structure as a girt on grade or "splashboard" in a post frame construction system. In such systems, different building parts must be attached to the precast concrete structure. In one aspect of the present invention, this method should increase versatility and facilitate quicker installation of fastener parts for optimal onsite field construction efficiency.

In one aspect of the present invention, a first attachment part 91A and a second attachment part 91B may be embedded in a pre-stressed, pre-cast structure. The first attachment part 91A has a first body 93A. The first body 93A has a first concrete structure facing side 95A and a first plurality of attachment members 97A extending from the concrete structure facing side 95A. The second attachment part 91B has a second body 93B. The second body 93B has a second concrete structure facing side 95B and a second plurality of attachment members 97B extending from the concrete structure facing side 95B (see below). The first and second attachment parts 91A, 91B may be spaced apart forming a compressible junction 99 therebetween. The pre-cast, pre-stressed concrete structure is formed from uncured cement. At least of a portion of the first and second attachment members 97A 97B are embedded in the pre-cast, pre-stressed concrete structure. As discussed below, the first and second attachment parts 91A, 91B may be composed of wood, lumber, plastic, metal or a composite material.

With reference to FIGS. 25-27C, a system 100 includes one or more attachment parts or blocks, e.g., pieces of wood or lumber, being integrated with the precast cement structure. Concrete is a material that requires pre-drilling, so it may require additional work to attach pieces, building components to the cement structure. The use of an attachment part or block allows for the easy and efficient installation of building components, for example, ribbed steel panels. The panels may be bolted or otherwise fastened to the integrated piece of lumber.

Figure 25:
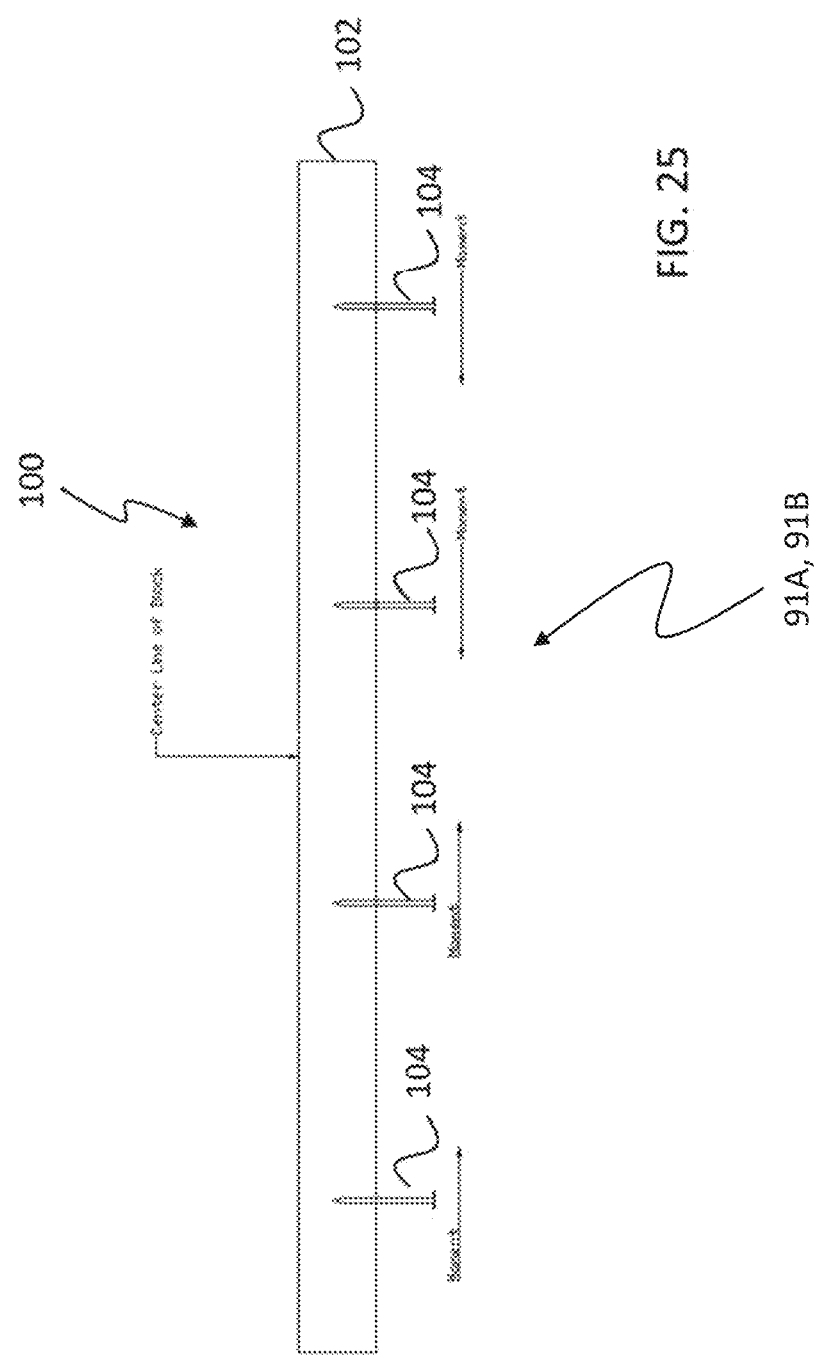

With particular reference to FIG. 25, an exemplary block, e.g., piece of lumber, 102 is shown that may be integrated with the precast cement structure during the casting process (see above). As shown, the block 102 includes a number of shear studs 104 embedded therein. In the illustrated embodiment, an even number of shear studs 104 are provided: one half of the shear studs 104 on one side of the center of the block 102 and one half of the shear studs 104 on the other side of the center of the block 102. In other embodiments, see for examples, FIGS. 26A-27C, an odd number of shear studs 104 may be provided.

However, casting a block 102 with shear studs 104 into a pretensioned concrete structure poses new problems that must be addressed in order to maintain a geometrically sound and acceptable member.

The shear studs 104 may be cast into the concrete member during the pouring process. As discussed above, the applied tension on the rebar is released after the cement is cured. When the tension is released in the cured, pre-tensioned, precast concrete structure, a compression force (see FIG. 25) is transferred causing the structure to decrease in length in an incremental amount varying by the tension applied, the cross-sectional area of the member, and its composition.

Figure 28:

This poses a problem for any material that is cast into the pre-tensioned, precast concrete structure as the item cast into the structure must have the ability to be slightly compressed at a rate similar to the concrete structure. If the item cast into the concrete member has dissimilar elastic properties or unsymmetrical geometric properties, the resulting internal stresses can yield unacceptable deflection (see FIG. 28).

With reference to FIG. 29, in one aspect of the present invention, this issue may be solved by creating a relief cut in the block 102 or provide a plurality of blocks 102 with a relief or space. The relief may be filled with a compressible material 108 casting the pre-cast concrete structure 106. This "compressible void" acts as a cushion for the blocks 102 to compress along with the precast concrete structure 106.

Even with the "compressible void", a certain amount of moment is applied to the block(s) 102 due to the shear transfer facilitated by the shear studs 104 and the fact that they are a distance away from the centerline of the blocks 102 (see FIG. 25). While this moment is a function of the compression force, the size of the blocks 102, and the frequency of shear studs 104, the stress and deflection in the block 102 is a function of its moment of inertia and the moment caused by the compression. As the moment of inertia is related to the cross-sectional area and length, the relationship is such that with all other variables equal, a block 102 with less length will yield less deflection. This relationship may be used to determine the optimal distance between "compressible voids" for each value of pretension force. This inverse relationship is such that higher pretension values require smaller distance between "compressible voids".

In one aspect of the present invention, a method is provided. Stress is applied to a reinforcing member. The first and second attachment parts are positioned at predetermined positions relative to the reinforcing member. The first attachment part has a first body. The first body has a first concrete structure facing side and a first plurality of attachment members extending from the concrete structure facing side. The second attachment part has a second body. The second body has a second concrete structure facing side and a second plurality of attachment members extending from the concrete structure facing side. The first and second attachment parts are spaced apart forming a compressible junction. A concrete form is positioned at a predetermined location about the reinforcing member and the first and second plurality of attachment members. Uncured cement is poured in the concrete form. The uncured cement encases at least partially, the reinforcing member and the first and second plurality of attachment members. Then, the cement is allowed to cure and the stress is released from the reinforcing member.

It should be noted that the steps of this method do not necessarily need to be performed in the order listed above. For example, the step of positioning the first and attachment parts at predetermined positions relative to the reinforcing member may be performed before or after the uncured cement is poured into the form.

In another aspect of the present invention, a method to attach the block or lumber 102 to the precast concrete structure 106 is provided. As concrete does not chemically bond with wood, a system 100 of mechanical anchoring is required. In the illustrated embodiment, a series of shear studs 104 is placed in the lumber or block 102. A portion of the length of each shear stud 104 remains exposed. The cementitious material is then cast around the shear studs 104, thereby bonding the lumber to the precast concrete structure 106. The spacing of the shear studs 104 is critical and varies depending on the amount of load that is required to be transferred from the block(s) 102 into the precast concrete structure 106. The frequency of the shear studs 104 may be increased beyond the minimum requirement to allow the cement structure(s) to be cut in any location while maintaining adequate shear transfer.

The method of applying shear studs 104 to the underside of a block or wooden member 102 before the member is cast in cementitious material is shown in FIGS. 26A-27C. In the illustrated embodiment, the spacing between studs is 4" though this is subject to change with corresponding structural loads to be transferred into the precast concrete structure 106. The size of the lumber block 102 depicted is a 1.5" cross sectional-square though this is also subject to change dependent on the application.

Figure 27A:
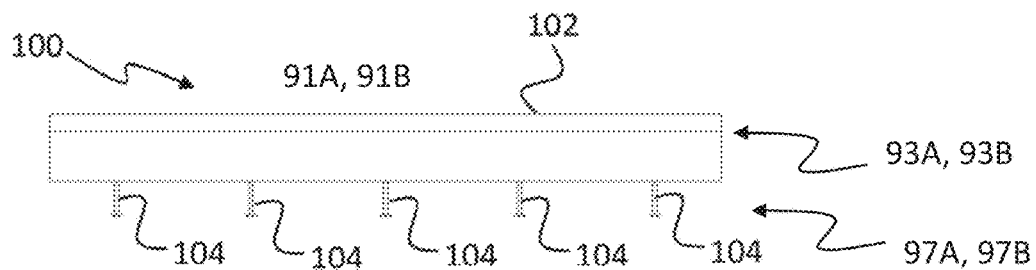
Figure 27B:
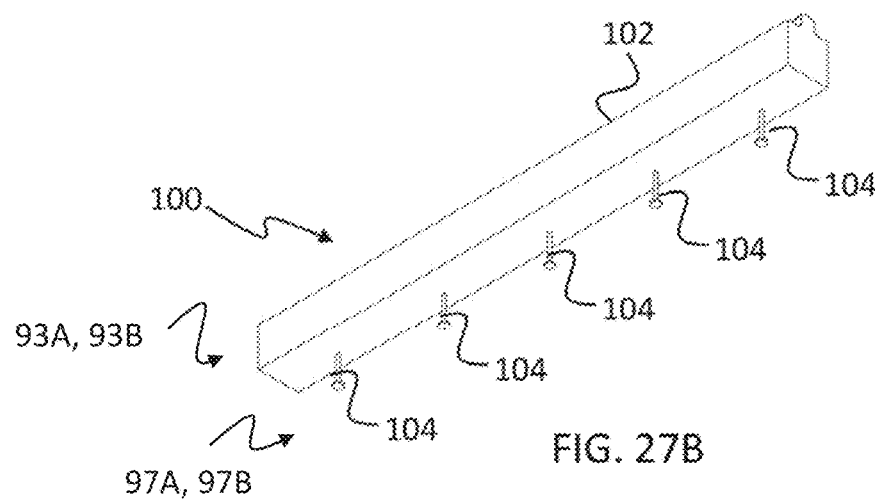
Figure 27C:
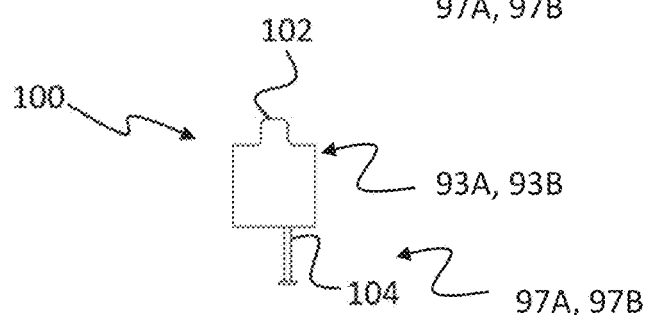

It is important to note that the shear studs 104 in the block 102 should be placed such that the shear studs 104 do not interfere with any reinforcing elements that may be within the cementitious material. It is also important to note that the shape of the wooden block is not restricted to square. Any shape that suits a particular application as long as there is a flat base for the installation of the shear studs 104 will be acceptable. The shear studs 104 should be comprised of a corrosion resistant material. For example, FIGS. 26A-26C illustrate a block 102 having a square cross-section. In particular, the block 102 is composed of a 1.5"×1.5' treated lumber block 102 having a maximum length of 24". The shear studs 104 are corrosive resistant fasteners having a 4" spacing. In FIGS. 27A-27C, the block 102 has a groove (as shown) that may be useful for fastening building components thereto.

The spacing of the "relief cuts" and resulting "compressible void" is subject to change in pretensioned elements under differing loads.

Method to Attach Metal Plate or Fin to a Precast/Pre-Stressed Concrete Member

In an alternative embodiment, the first and second attachment parts may be made from metal. For example, an integral piece of galvanized steel or metal plate 200 may include with the concrete structure to facilitate an easy installation of building components. However, casting a section of galvanized steel 200 (FIG. 30A) into a pretensioned concrete structure poses new problems that must be addressed in order maintain a structurally sound member.

Figure 30A:
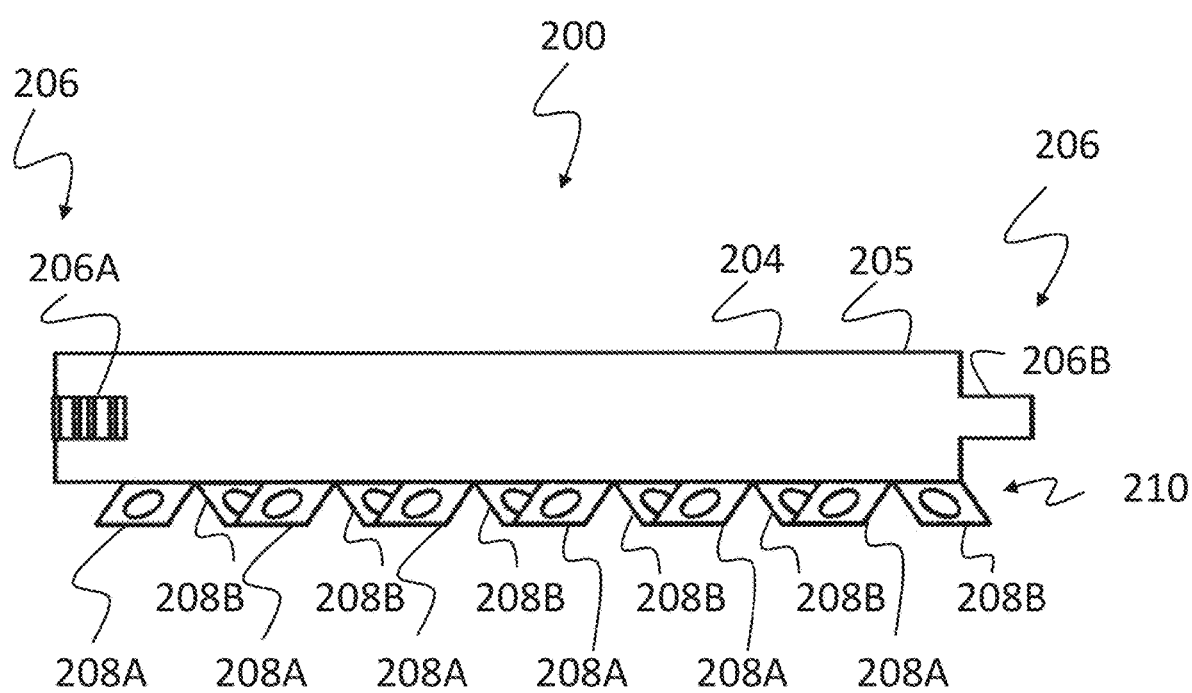
Figure 30B:
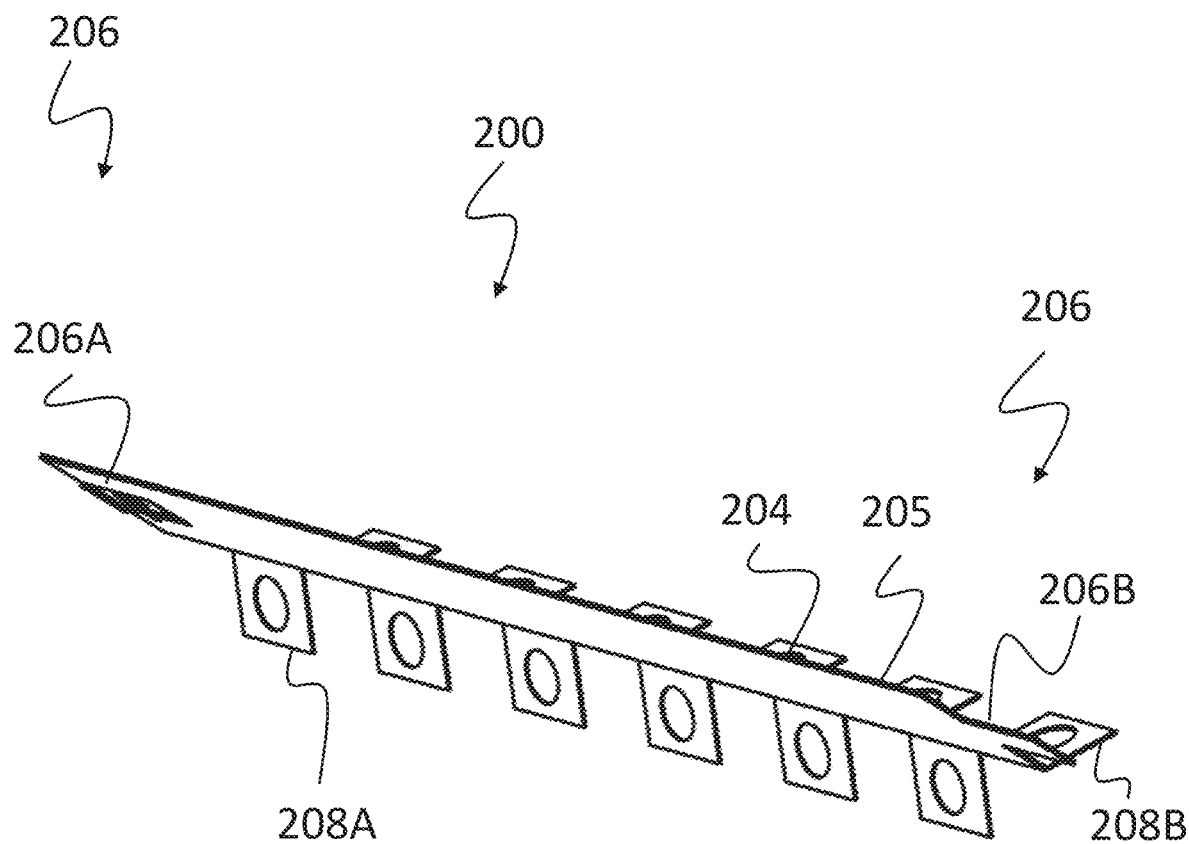

With reference to FIGS. 30A and 30B, a system 200 includes one or more metal plates 204 that are integrated with the precast, pre-stressed concrete structure 210. This allows for the easy and efficient installation of building components, for example, ribbed steel panels.

In one aspect of the present invention, the system 200 includes a plurality of plates 204. In the illustrated embodiment, each plate 204 includes an upright member 205 to which building components may be fastened. Each plate 204 also includes a slot and groove mechanism 206 that provides a slip joint between adjacent plates 204. The slot and groove mechanism 206 includes a tab 206B and a plurality of offset horizontal members 206A which are offset to form a slot for receiving a tab 206B from an adjacent plate 204. Each plate 204 also includes a plurality of fins 208. The fins 208 are embedded in the uncured cement that forms the precast, pre-stressed cement structure 210. In the illustrated embodiment half of the fins 208A, are deflected from the upright member 205 at a predetermined angle. The other half of the fins 208B are deflected from the upright member 205 at an opposite angle. Further, in the illustrated embodiment each fin 208 has a hole.

When the tension is released in the cured, pretensioned, precast concrete structure 210, the concrete structure 210 will decrease in length in an incremental amount varying by the tension applied and the cross-sectional area of the structure 210. This poses a problem for any material that is cast into the pretensioned, precast concrete structure 210 as the item cast into the item must have the ability to be slightly compressed. If the item cast into the precast concrete structure 210, and the member is not compressible at a rate similar to the concrete structure 210 then the resulting internal stresses can cause unacceptable deflection of the entire member.

This issue is addressed in several ways. The first method involves creating a slip joint between sections of metal plates 200. This allows smaller pieces of galvanized metal to be used and allows them to "slip" a small amount at the joints where the two pieces meet. The second method for solving this issue involves leaving a gap between the pieces of galvanized metal fin and filling said gap with a compressible material. This "compressible void" allows the metal plates 200 to move closer together (or further apart) as tension is released thus relieving a portion of the internal stress in the material yielding a finished product that is suitable for the intended use.

The same principal used to describe the moment to length relationship of block(s) 102 in section [0044] can also be applied to plates 200. That is to say that there is a moment applied upon plates 200 as their contact with the compression force is a distance away from the centerline of plates 200. While this moment is a function of the geometry of tabs 208, the compression force of the reinforcing elements and the cross sectional geometry of the plate 200, the stress and deflection of said plate is a function of its moment of inertia and the moment induced by the compression. As the moment of inertia is related to the cross sectional area and the length, it could be shown that if all other variables were equal, a plate 200 of a shorter length would yield less deflection. This relationship along with the determination of an acceptable deflection range may be used to find the optimal length of the plate 200 as well as optimal dimensions for the "compressible voids" or "slip joints." This same relationship could also be used to show that a higher pre-tensioning load would require a decrease in the length of plate 200 in order to keep deflection within said acceptable range.

The second problem comes with developing a method to attach the galvanized steel or "plate 200" to the precast member. While the galvanized steel will chemically bond to the cementitious material to a certain extent, a level of mechanical bonding is required. This is often achieved by creating a surface on the material that is non-uniform. A non-uniform surface will create small shear faces in the cementitious material along the length of the bonding surface. In the case of the galvanized steel fin 208A, 208B, this can be achieved by altering the surface geometry of the part. Both putting holes in the fins 208A, 208B and putting bends in the part will each sufficiently increase the bond strength of the galvanized steel and the concrete to a level that is acceptable for this application.

It is important to note that fins 208 or plate 200 is made from a corrosive resistant material or may be coated with a corrosive resistant substance or protection layer. Whenever a steel sample is cast within a concrete member there is the potential that the steel will deteriorate over time causing the concrete sample to crack, spall and eventually fail. This is caused in part by chloride ions within the concrete sample that break down the protective layer around the steel that is created during the early stages in the concrete curing process. Once this protective layer is gone, there is opening for oxidation of the iron ions within the steel which yields iron oxide or what we refer to as rust. The process of galvanization adds a protective layer of zinc over the entire steel part. Once within the concrete this protective zinc coating propagates out, creating an even broader barrier against the chloride ions and oxidation.

In another aspect of the present invention, a method of producing a galvanized metal plate 200 that can be cast into a pretensioned, precast concrete member and that facilitates the attachment of said structure to other building components is provided. The galvanized plate 200 is of an altered cross sectional geometry such that the shape adds an increased level of mechanical bonding with the cementitious material it is cast into. The galvanized plate 200 is of a specified length which is varied in relation to the application and pretensioning loads used in given member. The relationship is such that a higher pretension load will require a shorter maximum length plate 200. The ends of each plate 200 are shaped in such a manner that they fit together as a "slot and tab" mechanism. This allows the plate 200 and cementitious member 210 to move linearly with respect to one another without moving in the shear direction.

Method to Attach a Nailable Substrate to a Precast/Prestressed Concrete Member

In order to employ a precast concrete member 106 as a splashboard in a construction system, a method of attachment for all building parts must be developed. This method should increase versatility and facilitate quicker installation of fastener parts for optimal connection efficiency. It was determined that an integral nailable substrate could be included with the concrete member to facilitate an easy installation of, e.g., steel panels or exterior sheathing along with the corresponding trims and accessories. Casting a section of a nailable material with attachment members 97A, 97B (see above), such as shear studs, into a pre-tensioned concrete member poses new problems that must be addressed in order to maintain a geometrically sound and acceptable member. When the tension is released in a cured, pre-tensioned, precast concrete member, a compression force is transferred causing said member to decrease in length in an incremental amount varying by the tension applied, the cross sectional area of the member, its composition, and resulting modulus of elasticity.

This poses a problem for any material that is cast into a pre-tensioned, precast concrete member as the item cast into the member must have the ability to be slightly compressed at a rate similar to the concrete member. If the item cast into the concrete member has dissimilar elastic properties such that the center of the pre-stress load is not concentric with the center of rigidity of the combined member, the resulting internal stresses can yield unacceptable deflection.

The relationship between tension force, modulus of elasticity and overall length change of the member is such that a higher force with and equal Young's Modulus will yield a larger decrease in length. Furthermore, if the tension force is equal and the modulus of one portion of the member is lower than another portion of the member, the section with a lower modulus will decrease in length by a greater amount. If we combine these two ideas it could be stated that if a member has a large variance in Young's Modulus, the tension force could be varied through the plurality of reinforcing elements such that the overall decrease in length of the member would be consistent throughout.

A method to attach the nailable substrate to the precast concrete is provided. As concrete will not chemically bond with many nailable materials, a system of mechanical anchoring is required. It was found that a series of attachment members, e.g., shear studs, could be placed (attached, screwed, nailed, driven, etc. . . . ) in the nailable substrate with a portion of the length of said stud remaining exposed.

The cementitious material is then cast around these studs bonding the nailable member to the cast concrete member. The spacing of these studs is critical and varies depending on the amount of load that is required to be transferred from the nailable substrate into the precast concrete member. Frequency of studs is increased beyond the minimum requirement to allow members to be cut in any location while maintaining adequate shear transfer.

Figure 31:
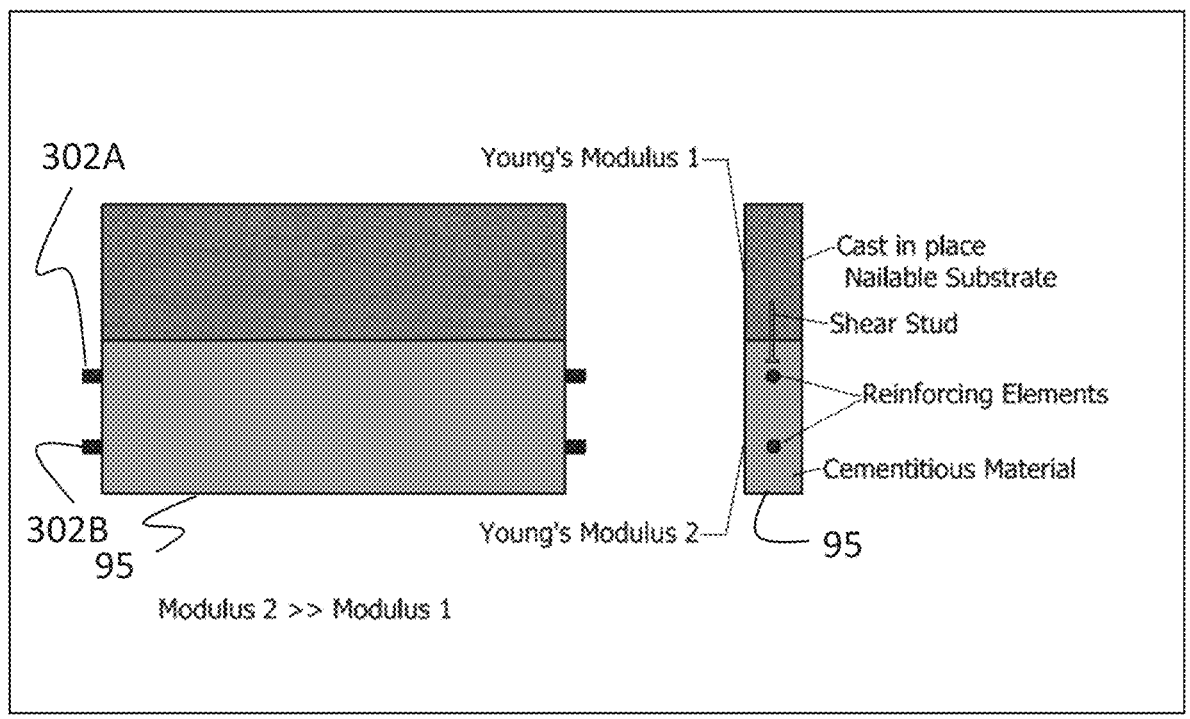

The method of applying studs to a face perpendicular to the intended nailing face of a nailable member before said member is cast in cementitious material is illustrated in FIG. 31. The spacing between studs in this figure is 4" though this is subject to change with corresponding structural loads to be transferred into the concrete member. The size of the nailable member is a standard nominal "2×4" though this is also subject to change dependent on the application.

It is important to note that the studs in the nailable member should be placed such that they do not interfere with any reinforcing elements that may be within the cementitious material. It is also important to note that the shape of the nailable member is not restricted. Any shape that suits a particular application as long as there is a flat base for the installation of the studs will be acceptable. The shear studs used should be comprised of a corrosion resistant material.

As is shown in FIG. 31 and described herein, if Modulus 1 is significantly less than Modulus two, a higher tension load can be placed on the lower of the two reinforcing elements 302A, 302B shown in order to equalize the decrease in length across the entire member thus eliminating the change of deflection from these internal stresses. The amount that the tension is varied between the reinforcing elements 302A, 302B is dependent on the difference in the Modulus's in the member as well as the reinforcing element locations in relationship to the centroid of the member. The cross sectional area of each element 302A, 302B that comprises the member will also affect the required tension variation. It should be noted that a concrete member may have more than two such elements. If such member has more than two reinforcing elements, the tension load can be varied among them in a "stepped" fashion in order to meet the requirements of the member. It should be noted that reinforcing elements may be suitable reinforcing member, bar, rod, including the reinforcing members, bars, or rods disclosed herein, or any other suitable reinforcing member.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the present invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A system for allowing components to attach to a pre-cast pre-stressed concrete structure, comprising:
   a first attachment part having a first body, the first body having a first concrete structure facing side and a first plurality of attachment members extending from the concrete structure facing side; and,
   a second attachment part having a second body, the second body having a second concrete structure facing side and a second plurality of attachment members extending from the concrete structure facing side, wherein the first and second attachment parts are composed of metal and the first and second bodies include a metal plate and the first and second plurality of attachment members including a plurality of tabs extending from the respective metal plate, wherein the first and second attachment parts are spaced apart forming a compressible junction therebetween, wherein the compressible junction is formed by a slip joint formed by adjacent ends of the first and second attachment parts, wherein the pre-cast, pre-stressed concrete structure is formed from uncured cement, at least of a portion of the first and second attachment members being embedded in the pre-cast, pre-stressed concrete structure and the first and second bodies being outside of the pre-cast, pre-stressed concrete structure.

2. The system, as set forth in claim 1, wherein a number of attachment members in the first plurality of attachment members is the same as a number of attachment members in the second plurality of attachment members.

3. The system, as set forth in claim 1, wherein a number of attachment members in the first plurality of attachment members is different than a number of attachment members in the second plurality of attachment members.

4. The system, as set forth in claim 1, wherein each of the first and second bodies include a groove configured to receive a component.

5. The system, as set forth in claim 1, wherein the first and second bodies include a metal plate and the first and second plurality of attachment members including a plurality of tabs extending from the respective metal plate.

6. The system, as set forth in claim 5, wherein the metal plate and plurality of tabs of each respective attachment member are unitarily formed.

7. The system, as set forth in claim 5, wherein the metal plate has an associated plane and a first subset of the tabs are set at a predetermined angle relative to the plane and a second subset of the tabs are at an opposite angle relative to the plane.

8. The system, as set forth in claim 5, where each tab has non-uniform surface.

9. The system, as set forth in claim 8, where the non-uniform surface is created by a bend in each tab.

10. The system, as set forth in claim 8, wherein the non-uniform surface is created by an aperture in each tab.

11. The system, as set forth in claim 5, wherein the compressible junction is a void between the first and second bodies.

12. The system, as set forth in claim 1, wherein each of the first and second bodies have a tab located on one end and a plurality of offset horizontal members on the other end, the slip joint being formed by the tab of one of the first and second bodies and the plurality of offset horizontal members on the other of the first and second bodies.

13. The system, as set forth in claim 12, wherein the plurality of offset horizontal members form a slot to receive the tab.

* * * * *